(12) United States Patent
Bourgeais et al.

(10) Patent No.: US 10,066,727 B2
(45) Date of Patent: Sep. 4, 2018

(54) UNCOUPLING PULLEY WITH OFFSET CLUTCH

(71) Applicant: Hutchinson, Paris (FR)

(72) Inventors: Jean-Marc Bourgeais, Azay le Rideau (FR); Benoît Guillot, Larcay (FR); Hervé Varin, Joue les Tours (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 15/639,054

(22) Filed: Jun. 30, 2017

(65) Prior Publication Data

US 2018/0003282 A1 Jan. 4, 2018

(30) Foreign Application Priority Data

Jun. 30, 2016 (FR) ..................................... 16 56151

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |

(Continued)

(52) U.S. Cl.
CPC ............. *F16H 55/36* (2013.01); *F16D 7/005* (2013.01); *B60B 15/26* (2013.01); *F16D 41/20* (2013.01)

(58) Field of Classification Search
CPC .. F16H 55/36; F16H 2055/366; F16D 41/206; F16D 3/12; F02B 67/06

USPC ...................................................... 474/94, 70
See application file for complete search history.

(56) References Cited

U.S. PATENT DOCUMENTS

| | | | | |
|---|---|---|---|---|
| 2,866,349 A | * | 12/1958 | Heckethorn | ............ F02B 67/06 |
| | | | | 192/41 R |
| 2,885,896 A | * | 5/1959 | Hungerford, Jr. | ........ F16H 9/04 |
| | | | | 192/12 BA |

(Continued)

FOREIGN PATENT DOCUMENTS

| | | |
|---|---|---|
| DE | 10 2007 049905 A1 | 4/2009 |
| EP | 0 980 479 A2 | 2/2000 |

(Continued)

OTHER PUBLICATIONS

Search Report from French Application No. 1656151, dated Feb. 23, 2017, 2 pages.

*Primary Examiner* — Henry Y Liu
(74) *Attorney, Agent, or Firm* — Alston & Bird LLP

(57) ABSTRACT

Uncoupling pulley having a longitudinal axis, and including a wheel rim having a first zone, to receive a belt connecting the wheel rim to a first power transmission element, and second zone situated in the axial extension along the direction defined by the longitudinal axis of the pulley, of the first zone; a hub to be secured to a second power transmission element; one of the power transmission elements being driving, and the other being driven; a ring mounted below the second zone of the wheel rim and around the hub, so the ring can rotate, around the longitudinal axis, relative to the wheel rim and/or the hub; an elastically deformable element mounted between the hub and the ring; and a unidirectional clutch having an end fastened to the ring and the remaining part of which is mounted below the second zone of the wheel rim and above the ring.

17 Claims, 20 Drawing Sheets

(51) Int. Cl.
*F16D 7/00* (2006.01)
*B60B 15/26* (2006.01)
*F16D 41/20* (2006.01)

(56) References Cited

U.S. PATENT DOCUMENTS

| | | | | |
|---|---|---|---|---|
| 3,618,730 A * | 11/1971 | Mould, III | ............ | F16D 43/211 192/56.2 |
| 5,377,962 A * | 1/1995 | Ochs | .................... | F16F 15/126 267/141.3 |
| 6,083,130 A * | 7/2000 | Mevissen | ............... | F02B 67/06 474/70 |
| 7,591,357 B2 * | 9/2009 | Antchak | ............... | F16D 41/206 192/41 S |
| 7,618,337 B2 * | 11/2009 | Jansen | .................... | F02B 67/06 192/41 S |
| 7,712,592 B2 * | 5/2010 | Jansen | ...................... | F16D 3/52 192/41 S |
| 7,766,774 B2 * | 8/2010 | Antchak | ................. | F16D 7/022 192/41 S |
| 7,975,821 B2 * | 7/2011 | Antchak | ................. | F16D 7/022 192/41 S |
| 7,985,150 B2 * | 7/2011 | Kamdem | .................. | F16D 3/02 474/166 |
| 7,998,008 B2 * | 8/2011 | Kamdem | .............. | F16D 41/206 474/161 |
| 8,006,819 B2 * | 8/2011 | Dell | .................... | F16F 15/1232 192/104 C |
| 8,021,253 B2 * | 9/2011 | Dell | ......................... | F16D 3/02 464/57 |
| 8,132,657 B2 * | 3/2012 | Antchak | ................. | F16D 7/022 192/41 S |
| 8,172,056 B2 * | 5/2012 | Barraud | ................ | F16D 41/069 192/110 B |
| 8,602,928 B2 * | 12/2013 | Serkh | ........................ | F16D 3/12 474/70 |
| 8,678,157 B2 * | 3/2014 | Ward | ....................... | F16D 7/022 192/41 R |
| 8,813,932 B2 * | 8/2014 | Ward | ................... | F16D 41/206 192/41 S |
| 8,820,503 B2 * | 9/2014 | Schneider | ............. | F16D 41/206 192/41 S |
| 8,931,610 B2 * | 1/2015 | Serkh | .................... | F16D 41/206 192/55.5 |
| 8,944,947 B2 * | 2/2015 | Yamatani | ............... | F02N 15/023 474/166 |
| 8,951,153 B2 * | 2/2015 | Ishida | ..................... | F16D 43/18 474/74 |
| 8,985,293 B2 * | 3/2015 | Marion | .................... | F16D 13/76 192/113.32 |
| 9,033,832 B1 * | 5/2015 | Serkh | ........................ | F16H 55/36 474/70 |
| 9,169,914 B2 * | 10/2015 | Serkh | ........................ | F16H 55/36 474/70 |
| 9,206,892 B2 * | 12/2015 | Serkh | ........................ | F16H 55/36 |
| 9,291,253 B1 * | 3/2016 | Serkh | .................... | F16D 41/206 |
| 9,423,015 B2 * | 8/2016 | Chang | ..................... | F16H 55/36 |
| 9,441,681 B2 * | 9/2016 | Williams | ................ | B60K 25/02 |
| 9,476,497 B2 * | 10/2016 | Liu | .......................... | F02B 67/06 |
| 9,546,709 B2 * | 1/2017 | Schneider | ............ | F16F 15/1442 |
| 9,556,948 B2 * | 1/2017 | Yun | .......................... | F16D 41/06 |
| 9,638,270 B2 * | 5/2017 | Antchak | ................. | F16D 7/022 |
| 9,850,997 B2 * | 12/2017 | Cariccia | ................ | F16H 55/36 |
| 2005/0250607 A1 * | 11/2005 | Jansen | .................... | F02B 67/06 474/74 |
| 2006/0122014 A1 * | 6/2006 | Kamdem | .................. | F16D 3/02 474/70 |
| 2006/0144664 A1 * | 7/2006 | Antchak | ............... | F16D 41/206 192/41 S |
| 2007/0066426 A1 * | 3/2007 | Kamdem | .................. | F16D 41/206 474/94 |
| 2009/0176608 A1 * | 7/2009 | Jansen | .................... | F02B 67/06 474/74 |
| 2011/0015018 A1 * | 1/2011 | Yamatani | ............... | F02N 15/023 474/166 |
| 2013/0150191 A1 * | 6/2013 | Ishida | ..................... | F16D 7/028 474/94 |
| 2013/0217524 A1 * | 8/2013 | Antchak | ................. | F02B 67/06 474/94 |
| 2013/0233670 A1 * | 9/2013 | Ward | .................... | F16D 41/206 192/41 S |
| 2015/0252884 A1 * | 9/2015 | Serkh | ....................... | F16H 55/36 474/94 |

FOREIGN PATENT DOCUMENTS

| | | |
|---|---|---|
| EP | 2 511 557 A1 | 10/2012 |
| EP | 2 937 590 A1 | 10/2015 |
| WO | WO 2009/047816 A1 | 4/2009 |
| WO | WO 2009/054919 A1 | 4/2009 |
| WO | WO 2015/066800 A1 | 5/2015 |

* cited by examiner

UNCOUPLING PULLEY WITH OFFSET CLUTCH

FIELD

The invention relates to the field of uncoupling pulleys.

BACKGROUND

Such a pulley is for example proposed in document EP 0,980,479 (D1).

This pulley is shown in FIG. 1, in a longitudinal sectional view.

The pulley P comprises a wheel rim J and a hub M that can be coupled to one another via a torsion spring RT and a unidirectional clutch EU mounted in series with the torsion spring RT.

The torsion spring RT is built and arranged to transmit rotational movements imparted to the wheel rim J, for example by a belt mounted on the wheel rim and connected to a drive shaft, to the hub M such that the hub M, which is for example intended to be mounted on a shaft of an auxiliary device such as an alternator, can be driven in the same direction as the wheel rim ("coupling" mode).

The unidirectional clutch EU is for example built and arranged such that the hub M, and from there, the shaft on which this hub is intended to be mounted, can rotate at a speed exceeding the rotation speed of the wheel rim J, in particular when the pulley is decelerated, for example due to a deceleration of the motor ("overrunning mode").

Thus and traditionally, in "coupling" mode, the motor torque passes through the belt, the wheel rim J, the unidirectional clutch EU, which is then driven by friction, relative to the wheel rim J, the torsion spring RT, which is connected in series with the unidirectional clutch EU, the hub M, on which the torsion spring RT is mounted, and which then comes into contact with a component C fastened to the hub M, and lastly, the shaft on which the hub is mounted.

On the contrary, in the "overrunning mode", the unidirectional clutch EU disengages from the wheel rim J and the torsion spring RT, in series with the unidirectional clutch in the neutral position with zero torque.

One drawback of the pulley proposed in document D1 lies in the fact that the torsion spring RT may undergo very significant deformations (radial expansions) in the "coupling" mode. Indeed, in this operating mode, the torque passes through the torsion spring RT, without the radial expansion of the torsion spring, resulting from the application of the torque, being limited.

Consequently, the radial expansion of the torsion spring RT may be such that the latter comes into contact with the unidirectional clutch EU. Indeed, in document D1, the unidirectional clutch EU, which is placed below the receiving zone DE for the belt, is placed directly around the torsion spring RT.

This may make the device nonoperational.

This problem is known, and solutions to limit the radial expansion of the torsion spring have already been proposed.

Thus, to avoid this problem, document U.S. Pat. No. 7,975,821 B2 (D2) proposes implementing an intermediate part (referenced 110 in FIG. 2 of document D2) between the torsion spring and the unidirectional clutch.

The solution proposed in document D2, however, involves a pulley diameter at the receiving zone for the belt larger than the diameter of the pulley proposed in document D1.

This may pose practical difficulties, since the maximum acceptable diameter of the pulley at this belt receiving zone, defined by the machine or vehicle, in particular motor vehicle, builders, does not allow it to be used in any type of application. This limits the gear reduction ratio obtained between the crankshaft of the engine and the alternator. Practically speaking, an effective diameter of the toothing zone of 50 mm is impossible, but desirable. As a result, this also limits the possibilities for the sizing of the spring forming the unidirectional clutch.

Yet the torque transmitted between the wheel rim and the hub also passes through the unidirectional clutch, which further reduces the sizing possibilities for the unidirectional clutch.

SUMMARY

One aim of the invention is to propose an uncoupling pulley implementing a unidirectional clutch and not having at least one of the aforementioned drawbacks.

To that end, the invention proposes an uncoupling pulley provided with a longitudinal axis, said pulley including:

a wheel rim, comprising a first zone, intended to receive a belt connecting the wheel rim to a first power transmission element, and a second zone situated in the axial extension, namely, along the direction defined by the longitudinal axis of the pulley, of the first zone;

a hub intended to be secured to a second power transmission element;

one of the power transmission elements being driving, and the other being driven;

a ring mounted below the second zone of the wheel rim and around the hub, such that said ring can rotate, around said longitudinal axis, relative to the wheel rim, and/or the hub;

an elastically deformable element mounted between the hub and the ring;

a unidirectional clutch, one end of which is fastened to the ring and the remaining part of which is mounted both below the second zone of the wheel rim and above the ring; the pulley is such that the first zone of the wheel rim has an inner diameter, the second zone of the wheel rim has an inner diameter, the inner diameter of the second zone being larger than the inner diameter of the first zone.

The device may also have at least one of the following features, considered alone or in combination:

the pulley provides a cover mounted securely on the wheel rim, and in contact with the ring;

the unidirectional clutch is a spring, for example a helical spring with adjacent turns;

the end of the unidirectional clutch is housed in a slit of the ring, said pulley further including a wedge situated in the slit, and next to said second end of the unidirectional clutch;

the elastically deformable element is a torsion spring centered on the hub;

the end of the unidirectional clutch is arranged to contact with one end of the torsion spring;

the pulley is such that the end of the torsion spring that is in contact with the unidirectional clutch is curved, relative to the rest, defining a cylindrical general shape of said torsion spring, and the end of the unidirectional clutch is in contact with a side face of this curved end of the torsion spring;

the pulley is such that the end of the torsion spring that is in contact with the unidirectional clutch is curved, relative to the rest, defining a cylindrical general shape of said torsion spring, and the end of the unidirectional clutch is end to end with a side face of this non-curved end of the torsion spring;

the pulley is such that the hub comprises at least one lug and the ring comprises at least one aperture receiving said at least one hub lug, such that, in a relative rotation direction between the wheel rim and the hub, the torsion spring engages on the hub until said at least one hub lug abuts against one end of said at least one ring aperture;

the pulley includes at least one bearing situated between the wheel rim and the hub;

said at least one bearing includes at least one face, extending radially and in contact with the hub;

said at least one bearing is either made from a plastic material chosen from among polyether ether ketone (PEEK), polyethylene terephthalate (PET), polyamide (PA) filled with molybdenum disulfide ($MoS_2$) or polyamide filled with polytetrafluoroethylene (PTFE) or with a metal or metal alloy inner layer, covered by an outer layer filled with polytetrafluoroethylene;

the elastically deformable element is a body made from elastomer or elastomer thermoplastic;

the pulley provides at least one rolling bearing arranged between the hub and the wheel rim, advantageously below the first zone of the wheel rim.

BRIEF DESCRIPTION OF THE DRAWINGS

The invention will be better understood and other aims, advantages and features thereof will appear more clearly upon reading the following description, done in reference to the following appended figures.

DETAILED DESCRIPTION

A first embodiment of a pulley 100 according to the invention is shown in different views in FIGS. 2 to 7.

The uncoupling pulley 100 according to the invention includes a wheel rim 1 intended to be secured to a first power transmission element (not shown, for example a belt connected to a shaft of a vehicle engine, which would be a driving member in the case at hand). The wheel rim 1 is provided with a first receiving zone 11 intended to receive a belt, in the case at hand a belt of the poly V® type, making it possible to form the connection between the wheel rim 1 and the first power transmission element. The wheel rim 1 is also provided with a second zone 12 situated in the axial extension, namely along the direction defined by the longitudinal axis AX of the pulley 100, of the first zone 11.

Advantageously, the second zone 12 of the wheel rim 1 has an inner diameter $D_{12}$ larger than the inner diameter $D_{11}$ of the first zone 11 of this wheel rim 1.

Figure 1:
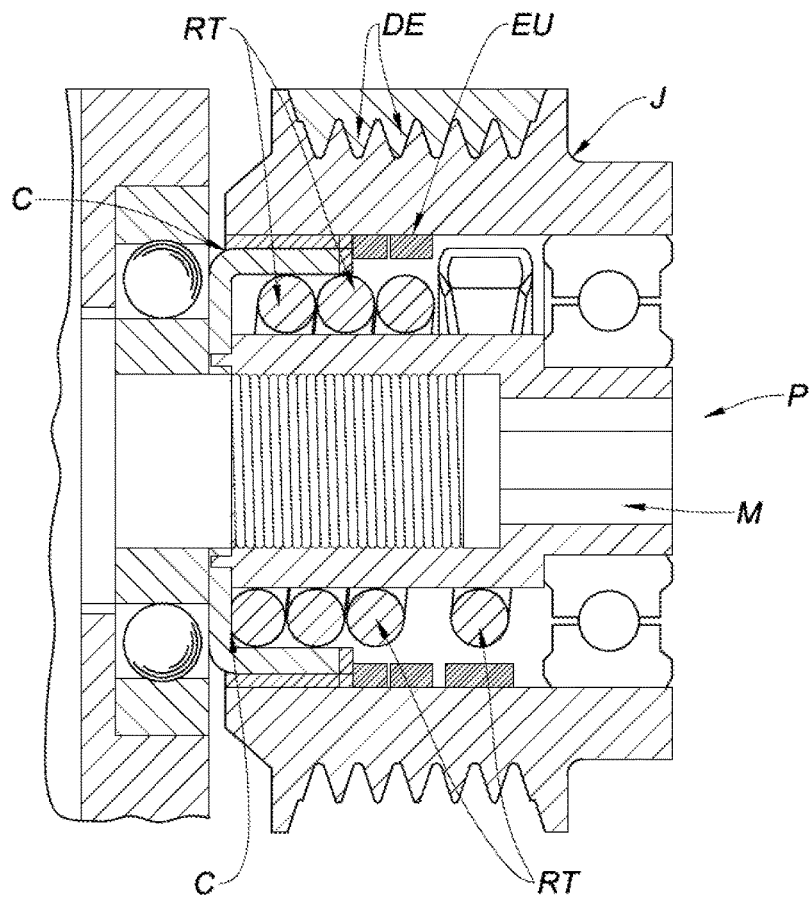
FIG. 1 shows a pulley according to the prior art.
Figure 2:
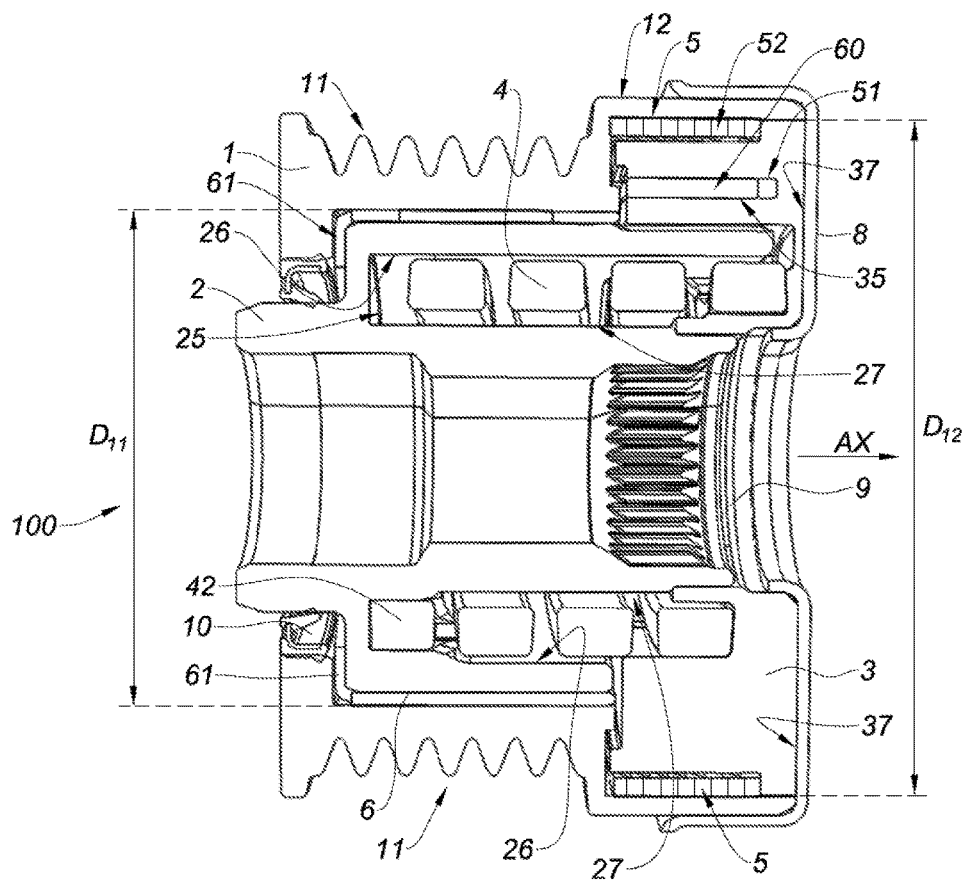
FIG. 2 shows a first embodiment of the invention, in longitudinal sectional view.

The pulley 100 also includes a hub 2 intended to be secured to a second power transmission element (for example, a shaft of an alternator, which in the case at hand would be a driven member) and including, in this first embodiment, at least one lug 21, 22, 23, advantageously extending axially (longitudinal axis AX in FIG. 2).

One of the power transmission elements is driving, and the other is driven.

The pulley 100 also includes a ring 3 mounted below the second zone 12 of the wheel rim 1 and around the hub 2. Furthermore, the ring 3 is mounted, within the pulley 100, such that it can rotate around the longitudinal axis AX, relative to the wheel rim 1 and/or relative to the hub 2. This rotational movement will be explained in more detail in the rest of the description. In this first embodiment, the ring 3 also includes at least one aperture 31, 32, 33 receiving said at least one hub 2 lug 21, 22, 23. The or each aperture 31, 32, 33 includes two ends 310, 311; 320, 321; 330, 331 able to serve as a stop for the corresponding lug 21, 22, 23 of the hub 2, depending on the operating mode of the pulley 100.

The pulley 100 is also provided with an elastically deformable element 4, in the case at hand in this first embodiment, a torsion spring 4.

This torsion spring 4 is mounted between the hub 2 and the ring 3. More specifically, the torsion spring 4 is centered on the hub 2, the latter advantageously providing a peripheral groove 25 to receive the torsion spring 4. To ensure its mounting between the hub 2 and the ring 3, the torsion spring 4 is advantageously fastened both to the hub 2 and to the ring 3. The fastening of the torsion spring 4 to the hub 2 and the ring 3 can be done by embedding or by other forms of retention, provided in the hub 2 and in the ring 3. For example, and as illustrated in the appended figures, one can see that the end 41 of the torsion spring 4 is embedded in the ring 3 (FIG. 5) and that the other end 42 of the torsion spring 4 is embedded in the hub 2 (FIG. 2).

The pulley 100 also includes a unidirectional clutch 5, in the case at hand and for example taking the form of a helical spring with adjacent turns.

This unidirectional clutch 5 is mounted inside the wheel rim 1. More specifically, the unidirectional clutch 5 comprises one end 51 fastened to the ring 3, for example by insertion or even embedding in an opening or slit 35 made in the ring 3. The remaining part 52 of the unidirectional clutch 5 is in turn mounted both below the second zone 12 of the wheel rim 1 and above the ring 3. It will be noted that this part 52 assumes the general form of a cylinder.

Advantageously, the other end (not shown in the appended figures) of the unidirectional clutch 5 is left free and is therefore not fastened to the ring 3 or the wheel rim 1. In this case, the unidirectional clutch 5 is chosen so that in its natural state, the diameter of this unidirectional clutch 5 is larger than that of the wheel rim 1, which makes it possible to ensure a pre-stress of the unidirectional clutch 5 when it is inserted in the inner bore of the second zone 12 of the wheel rim 1.

The end 51 of the unidirectional clutch 5 advantageously, and as shown in FIGS. 1 to 7 appended hereto, assumes the form of an arm. This end or arm 51 is advantageously in contact with the end 41 of the torsion spring 4, to provide a better torque transmission. More specifically, the end 41 of the torsion spring 4 that is in contact with the unidirectional clutch 5 is curved relative to the rest of the torsion spring, said rest defining a generally cylindrical shape. As a result, the end 51 of the unidirectional clutch is in contact with a side face 410 of the curved end 41 of the torsion spring 4. This design is facilitated by the presence of a bend 53 of the arm 51. In practice, the curved end can extend substantially radially. This particular design facilitates, in "coupling" mode, the closing work of the torsion spring 4 against the wall 27 of the hub 2.

It should be noted that advantageously, it is possible to provide a wedge 60 situated in the slit 35 of the ring 3 and next to the end or arm 51 of the unidirectional clutch 5. This wedge 60 facilitates the maintenance of the arm 51 in place during the torque transmission. Such a wedge 60 is in particular visible in FIGS. 2 and 4 as well as FIG. 16, in a partial exploded view, showing the unidirectional clutch 5 and the wedge 60 (the latter not having been shown in FIG. 3). The wedge 60 makes it possible to better maintain the arm 51 in the slit 35 provided in the ring 3 to receive this arm 51. In particular, it makes it possible to avoid buckling of the arm 51 during the torque passage.

It will be understood that the unidirectional clutch 5 is mounted in series with the torsion spring 4, via the ring 3, which keeps them in contact.

Figure 3:
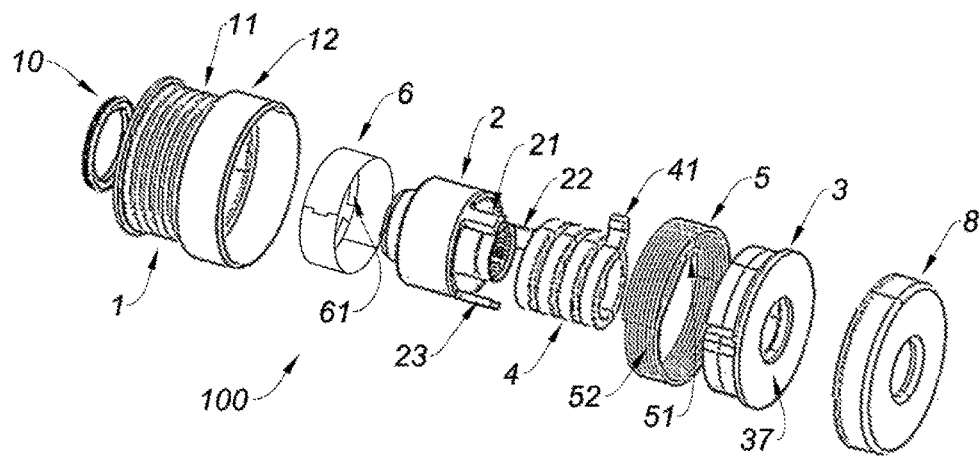
FIG. 3 is an exploded view of the pulley shown in FIG. 2.
Figure 4:
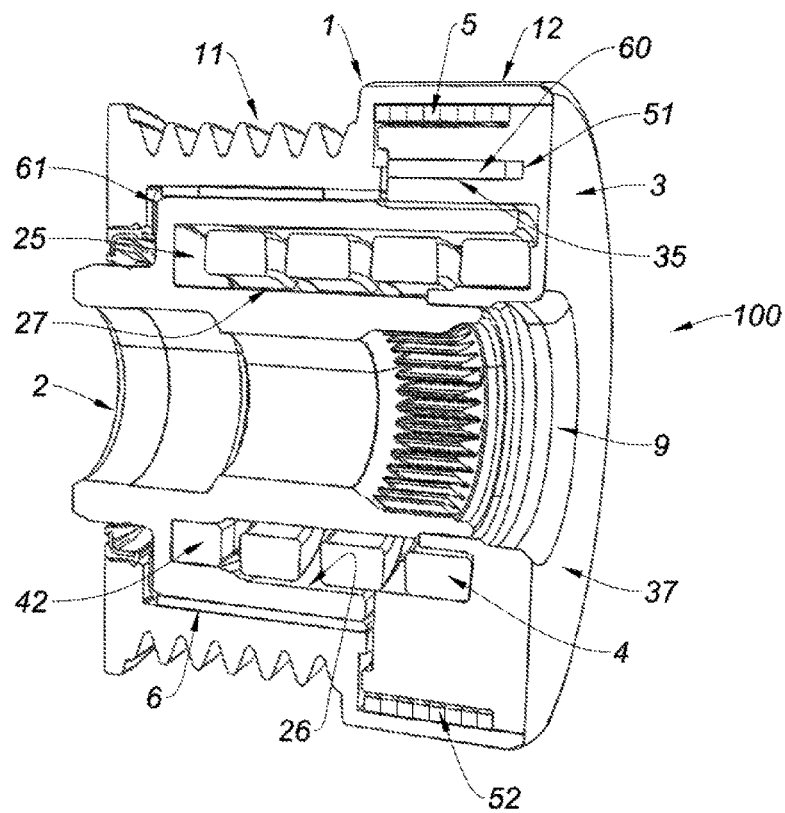
FIG. 4 is a perspective and sectional view of the pulley shown in FIG. 2.

Advantageously, and as illustrated in the appended FIGS. 1 to 7, in particular FIGS. 2, 3 and 4, the pulley includes at least one bearing 6, for example assuming the form of a cylindrical ring, inserted between the hub 2 and the wheel rim 1. The bearing 6 then serves as a guide for the hub 2 and replaces one or several rolling bearings, which are particularly cumbersome in the case of an implementation of a torsion spring 4. Said at least one bearing 6 advantageously includes a face 61, extending radially and in contact with the hub 2. This face 61 facilitates the mounting and holding in place of the bearing 6. Furthermore, the bearing 6 may be made from a plastic material chosen from among polyether ether ketone (PEEK), polyethylene terephthalate (PET), polyamide (PA) filled with molybdenum disulfide ($MoS_2$) or polyamide filled with polytetrafluoroethylene (PTFE). Alternatively, the bearing 6 may be made with a metal or metal alloy inner layer, covered by an outer layer filled with polytetrafluoroethylene (PTFE).

The pulley 100 lastly comprises a cover 8 with which a sealing stopper 9 is associated. The cover 8 is intended to cover the wheel rim 1, at the second zone 12 of the wheel rim 1, and is fastened to this wheel rim 1. Advantageously and as shown in the appended FIGS. 2 to 7, the cover 8 is mounted in contact with the ring 3, and more specifically in contact with the side face 37 of the ring 3, which faces the cover 8. The pulley 100 lastly comprises a sealing gasket 10 entering a side opening of the wheel rim 1, on the side opposite the cover 8.

We will now describe the operation of the pulley 100 according to this first embodiment of the invention.

Figure 5:
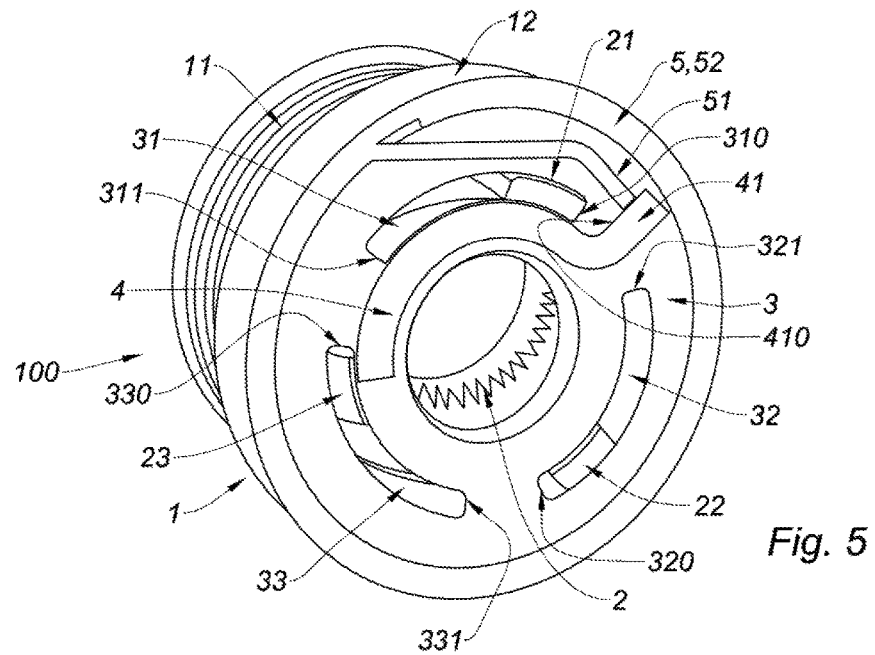
FIG. 5 is another perspective view of the pulley of FIG. 2, along a section different from that shown in FIG. 4.
Figure 6:
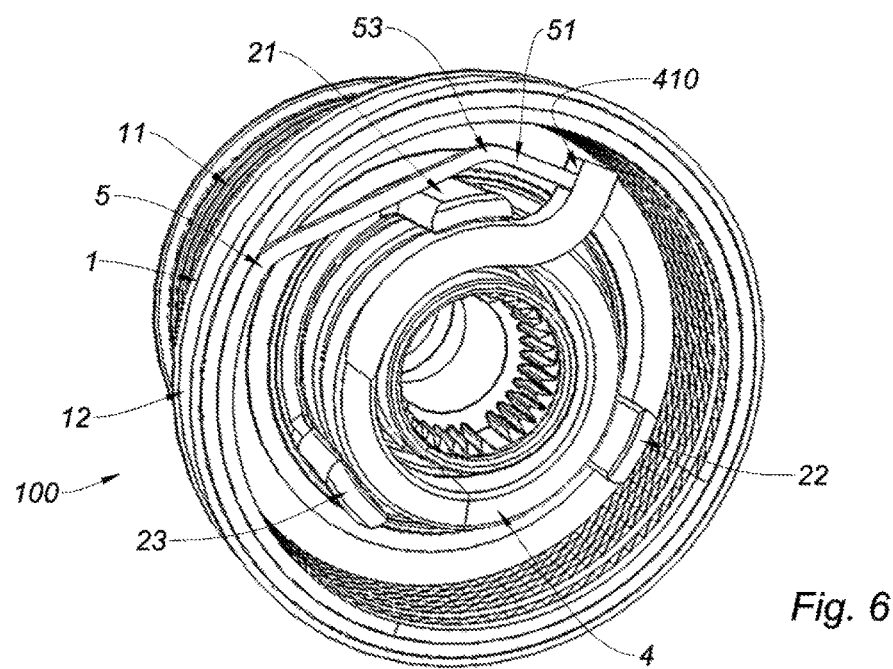
FIG. 6 is another perspective view of the pulley of FIG. 2 without the ring.

When idle, i.e., when the elastically deformable element 4, for example a torsion spring, is not stressed, the pulley 100 assumes the configuration shown in FIG. 5.

If the pulley 100, and more specifically the wheel rim 1, is rotated by a belt for example connected to an engine (typical case: acceleration phase of the engine), the wheel rim 1 will then rotate, by convention, in the clockwise direction.

The rotation of the wheel rim 1 causes the radial expansion of the unidirectional clutch 5, which will then exert a radial force against the inner bore of the wheel rim 1. The wheel rim 1 then rotates the unidirectional clutch 5 by friction. The unidirectional clutch 5 also being connected to the ring 3, the latter will also be rotated. In as much as the unidirectional clutch 5 is mounted in series with the torsion spring 4 via the ring 3, the torsion spring 4 will also close and thus cause the hub 2 to be driven in the direction of rotation of the wheel rim 1.

Figure 7:
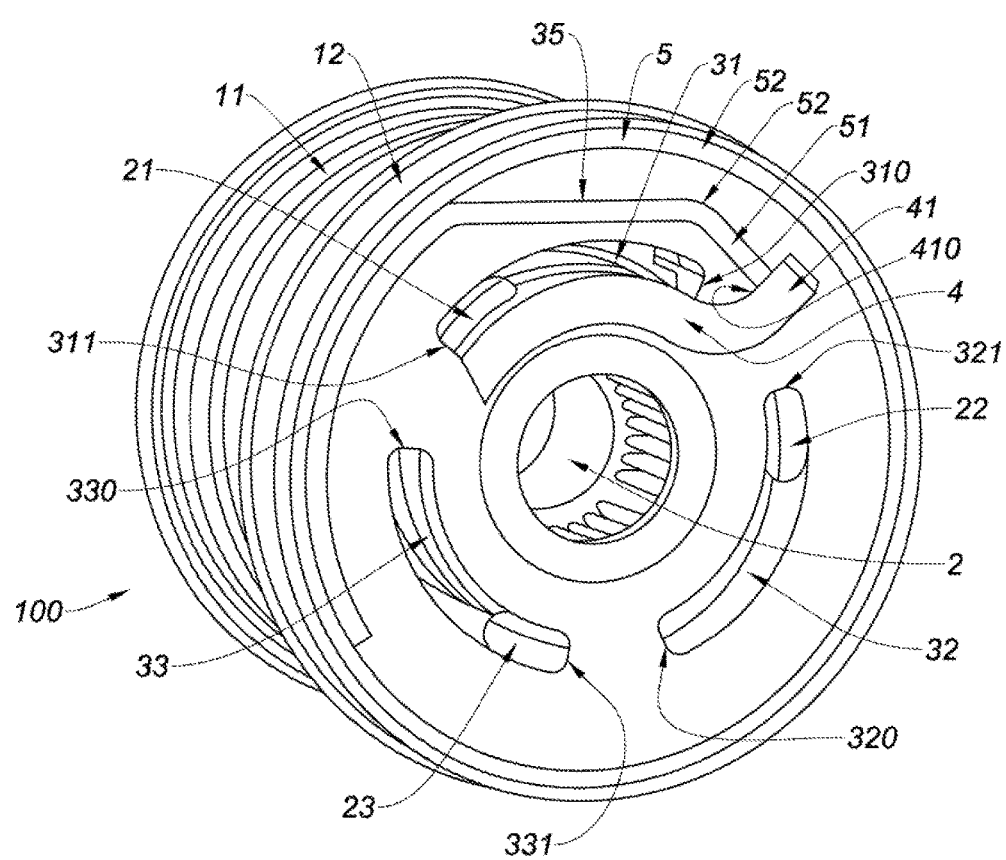
FIG. 7 is a sectional view of the pulley of FIG. 2 shown similarly to the illustration of FIG. 4, but in another operating mode.

When the torsion spring 4 closes on the hub 2, and more specifically on the wall 27 of the hub 2, the relative position between the ring 3 (or the wheel rim 1, which amounts to the same thing) and the hub 2 evolves from the position shown in FIG. 5 toward the position shown in FIG. 7. In other words, the or each aperture 31, 32, 33 of the ring 3 then moves relative to the or each corresponding lug 21, 22, 23 of the hub 2. In practice, the relative position between the ring 3 and the hub 2 depends on the value of the transmitted torque. Thus, the or each aperture 31, 32, 33 can move, relative to the corresponding lug 21, 22, 23, over an angle smaller than the maximum angle alpha 1 ($\alpha 1$) defined between the two opposite ends 310, 311, 320, 321, 330, 331 of the corresponding aperture 31, 32, 33 (to within the width of the lug). The or each aperture 31, 32, 33 can also move until an abutment occurs between the lugs 21, 22, 23 and the opposite end 311, 321, 331 of the or each aperture 31, 32, 33, i.e., up to this maximum angle alpha 1 ($\alpha 1$), as effectively shown in FIG. 7. This abutment, obtained by the presence of the or each hub 2 stop 21, 22, 23 and the corresponding apertures 31, 32, 33 of the ring 3 limits the radial deformation of the torsion spring 4. Indeed, when this abutment is reached, the excess torque goes from the ring 3 toward the hub 2 through the or each stop. This design makes it possible, in particular for applications where the torques to be transmitted are particularly high, to improve the lifetime of the torsion spring 4, and therefore of the pulley 100.

Figure 15:
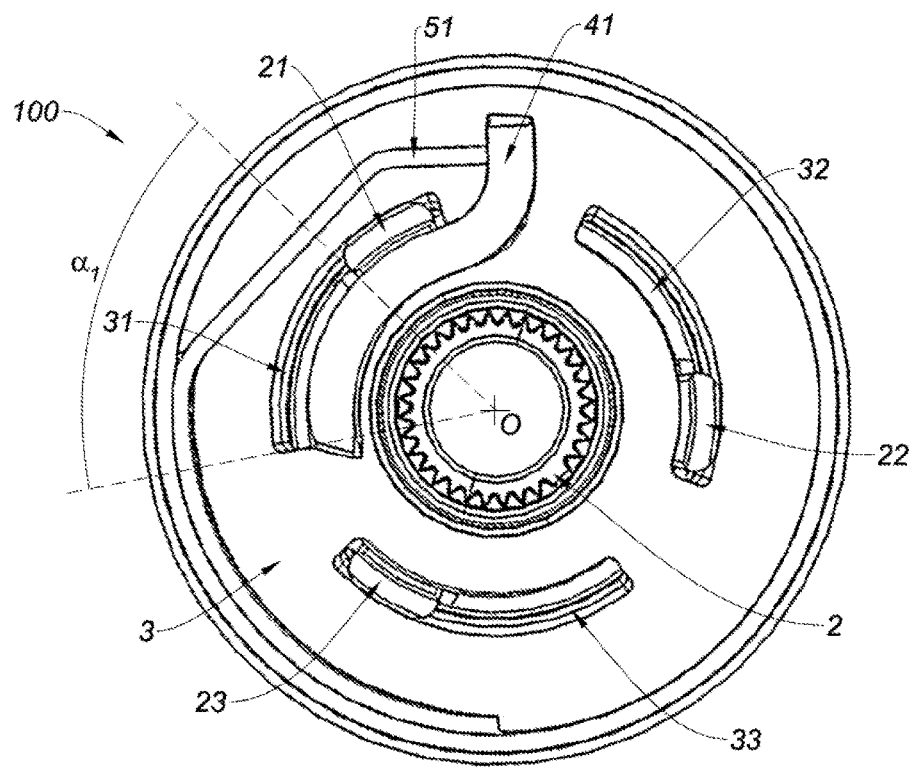
FIG. 15 is a front sectional view of the pulley according to the first embodiment of the pulley according to the invention.

It will be noted that the angle alpha 1 is shown in FIG. 15, which is a front view of the pulley 100 according to the first embodiment, in the position corresponding to that of FIG. 5.

Figure 8:
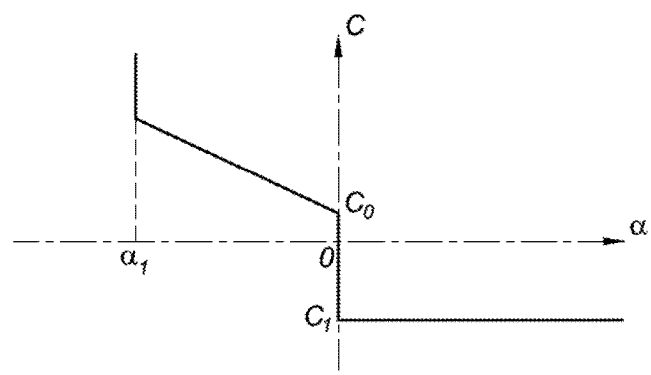
FIG. 8 is a graph showing the evolution of the torque transmitted between the driving element (wheel rim, for example) and the driven element (hub, according to this example) based on an angular evolution between these same elements.

FIG. 8 shows the torque transmitted between the wheel rim 1 and the hub 2 of the pulley 100 as a function of an angular evolution between these same elements. The reference (zero angle) corresponds to the idle position of the pulley (FIG. 5).

In this FIG. 8 (not to scale), the described operation corresponds to the negative or zero angles. The initial torque (zero angle) has a value $C_0$ (non-zero) that is related to the presence of the bearing 6, which contributes slight friction against the hub 2. Then, there is an increase in the torque, along a line, that reflects the engagement of the torsion spring 4 with the hub 2. Additionally, if the or each stop 21, 22, 23 arrives against the opposite end 311, 321, 331 of the corresponding aperture 31, 32, 33 (FIG. 7), the excess torque transmitted between the wheel rim 1 and the hub 2 passes through the ring 3, at the angle defined by the value of the 1 ($\alpha_1$).

All of the above information on the operation of the pulley 100 according to the first embodiment of the invention relates to the "coupling" mode.

If the wheel rim 1 decelerates (for example, if the motor driving it decelerates), this then causes the radial contraction of the unidirectional clutch 5, which stops any passage of torque between the wheel rim 1 and the unidirectional clutch 5, and therefore toward the hub 2. The hub 2 then experiences an overspeed relative to the wheel rim 1, as well as relative to the ring 3, which causes the radial expansion of the torsion spring 4, which returns to its equilibrium position (FIG. 5; absence of stress) and, at the same time, the or each hub 2 lug 21, 22, 23 returns toward its position of FIG. 5.

Once the position of FIG. 5 is reached, one then has the zero-value angle (FIG. 7). The torque is then at the value $C_0$, for the reasons explained above.

However, if the overspeed of the hub 2 is great enough, the hub 2 will then drive the ring 3 at an overspeed relative to the wheel rim 1, and therefore also relative to the cover 8 that is mounted fixed on the wheel rim 1 and in contact with the face 37 of the ring 3. The contact force between the ring 3 and the cover 8 is generated by an axial pre-stress of the spring 4. This pre-stress can be configurable based on the desired level $C_1$. This contact then involves, between the cover 8 and the ring 3, a friction that causes the torque to go from the value $C_0$ to the value $C_1$ (|C1|>C0, because the cover/crown friction is added to the hub/bearing friction). It should be noted that the driving is then done by the connection between the or each lug 21, 22, 23 and the end 310, 320, 330 of the corresponding aperture 31, 32, 33, without going through the torsion spring 4. The friction between the cover 8 and the ring 3 then makes it possible to decelerate the hub 2 more quickly. This is particularly interesting because the overspeed of the hub 2 relative to the wheel rim 1 generates noise phenomena that it is thus possible to limit.

All of the preceding in the case of a deceleration of the wheel rim 1 therefore relates to the "overrun clutch" mode.

In light of the preceding, it should be noted that the friction between the cover 8 and the ring 3 only occurs in the "overrun clutch" mode. Indeed, in the "coupling" mode, the ring 3 is driven by the wheel rim 1, such that there is no relative speed between the cover 8 and the ring 3. This friction is therefore taken advantage of when it is useful, namely in the "overrun clutch" mode, to improve the deceleration of the hub 2, the overspeed of the hub 2 generating noise phenomena that one seeks to limit. Furthermore, in the "coupling" mode, the absence of relative movement between the cover 8 and the ring 3 prevents mechanical losses by friction.

Conversely, the friction between the hub 2 and the bearing 6 occurs irrespective of the operating mode of the pulley, "coupling" mode or "overrun clutch" mode.

It will, however, be noted that in the context of the invention, it is not mandatory for the side face 37 of the ring 3 to be in contact with the cover 8.

Figure 9:
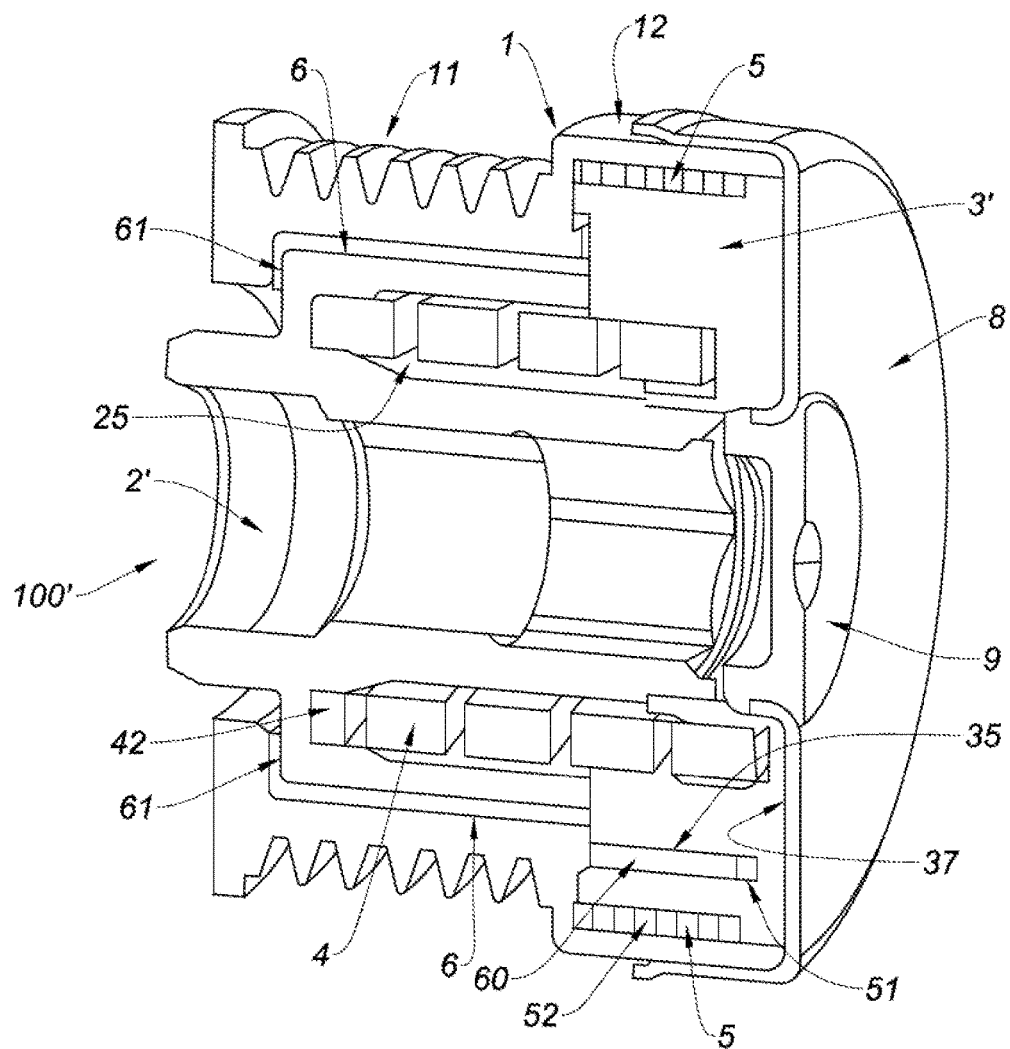
FIG. 9 shows a second embodiment of a pulley according to the invention, in a longitudinal perspective view.
Figure 10:
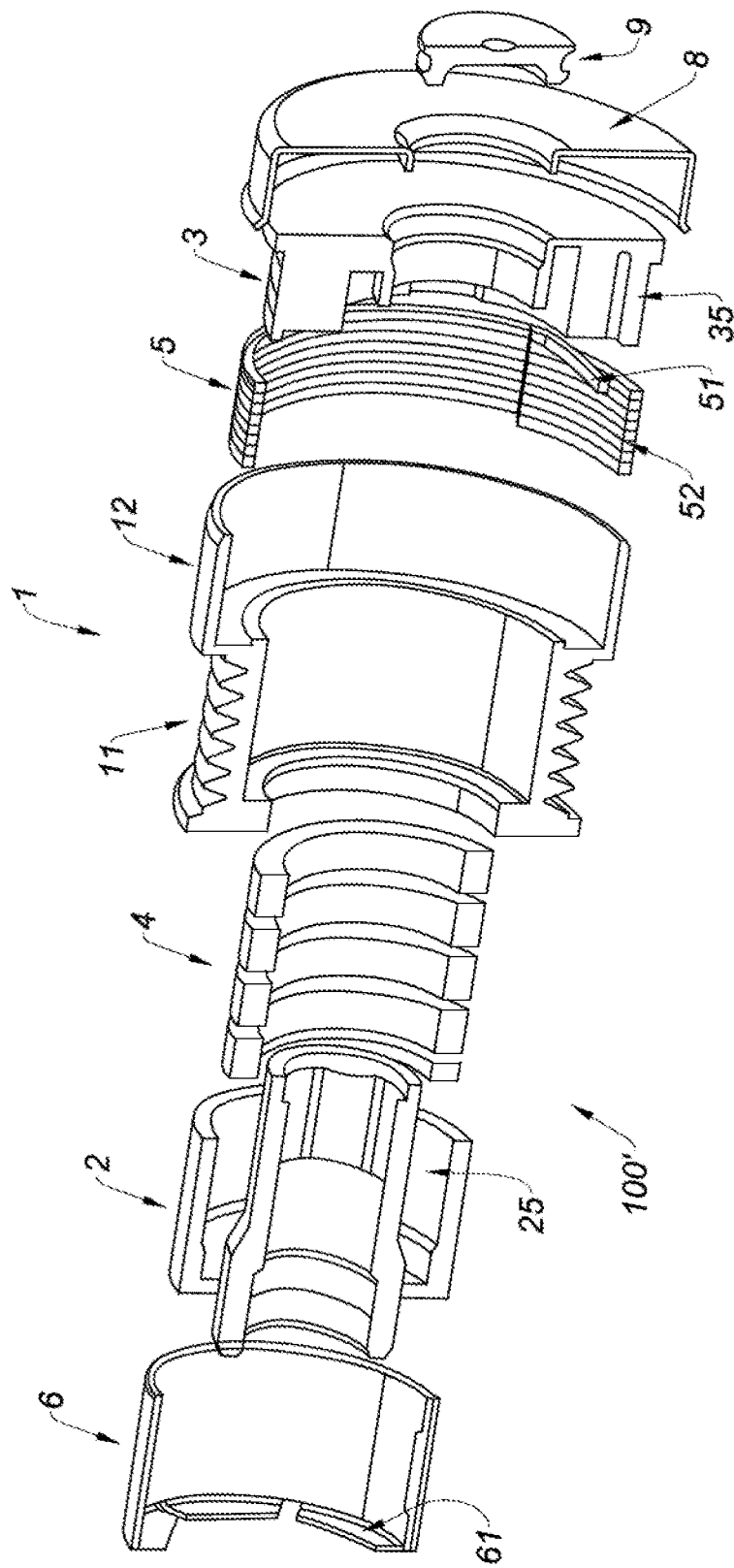
FIG. 10 is an exploded view of the pulley shown in FIG. 9.
Figure 16:
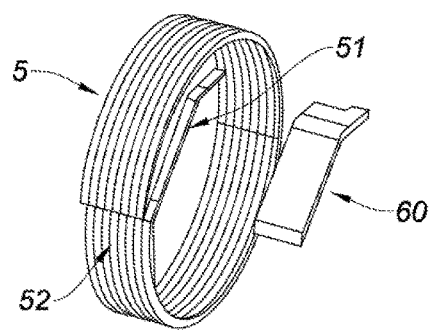
FIG. 16 shows a unidirectional clutch of the pulley and a wedge able to be used jointly with the unidirectional clutch.

We will now describe a pulley 100' according to a second embodiment of the invention, supported by FIGS. 9 and 10 (the sealing gasket 10 is not shown in the figures, but is present; likewise, in FIG. 10, only the wedge 60 is not shown, but is present in FIG. 9, this wedge 60 being present, when it is advantageously provided as shown in FIG. 16).

In this second embodiment, identical references refer to elements identical to those of the first embodiment.

The second embodiment differs from the first embodiment by the design of the hub and the ring.

Indeed, in this second embodiment, the pulley 100' includes a hub 2' that does not require lugs and, consequently, a ring 3' that does not require corresponding apertures. FIGS. 9 and 10 in fact show a hub 2' without lugs and a ring 3 without an aperture.

Consequently, in this second embodiment, no apartment is provided at a maximum angle, called alpha 1 for the first embodiment, to ensure a torque passage, in the "coupling" mode, directly between the ring 3' and the hub 2' without going through the torsion spring 4.

Indeed, such an abutment is not required for certain applications in which the torque transmitted between the wheel rim 1 and the hub 2' is limited.

In this second embodiment, in the "overrun clutch" mode, the friction torque between the cover 8 and the ring 3 passes directly over the torsion spring 4. This results in opening of the spring.

Otherwise, the design of the pulley 100' is identical to that of the pulley 100 of the first embodiment. This is in particular the case for the unidirectional clutch 5 and, if applicable, the wedge 60 shown in FIG. 16. This is also the case for the advantageous, but non-mandatory design of the placement of the ring 3' in contact against the cover 8 and the choice of the different materials, for example for the bearing 6. Consequently, the functional diagram of the pulley 100' corresponds to that of FIG. 8, with the exception of the torque increase (vertical line) at the angle alpha 1, which no longer exists in this second embodiment.

Figure 11:
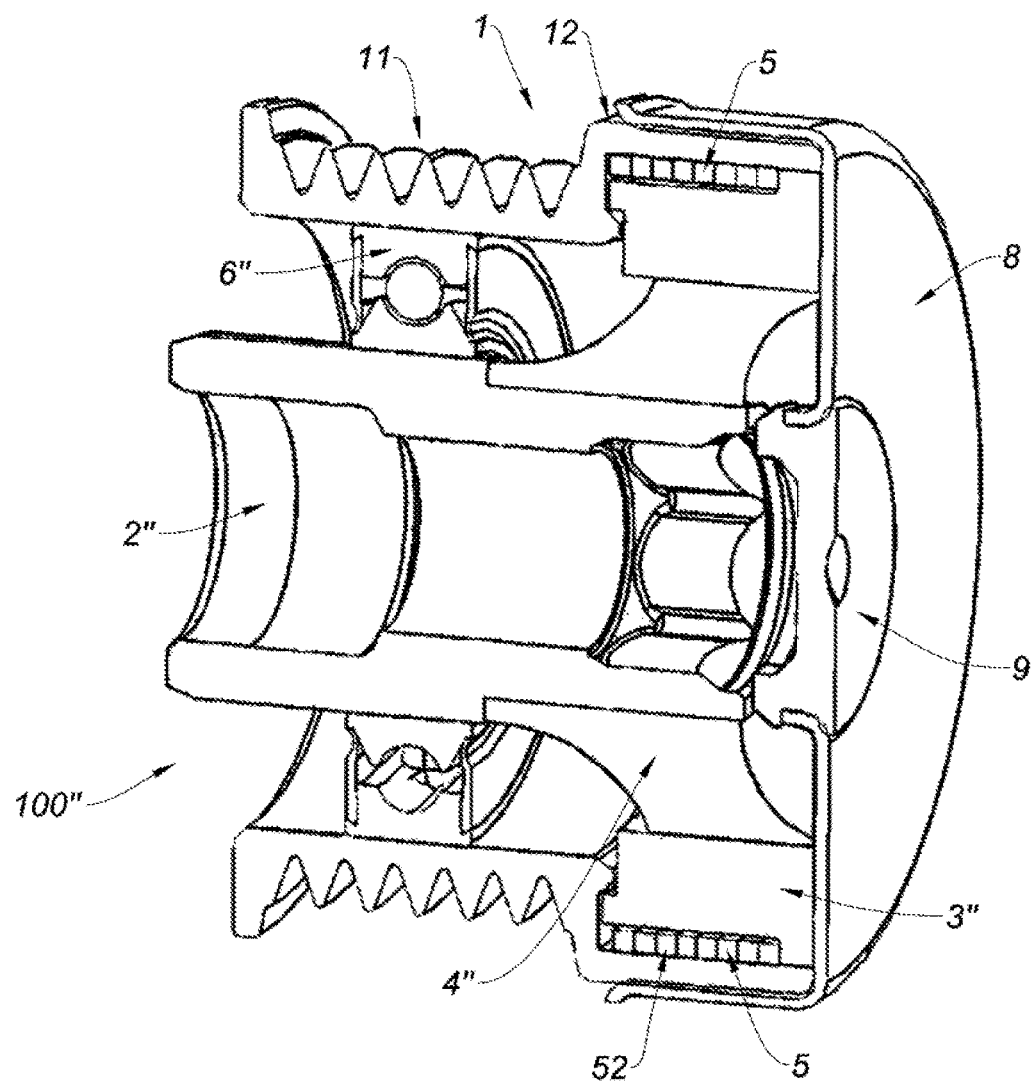
FIG. 11 shows a third embodiment of a pulley according to the invention, in a longitudinal perspective view.
Figure 12:
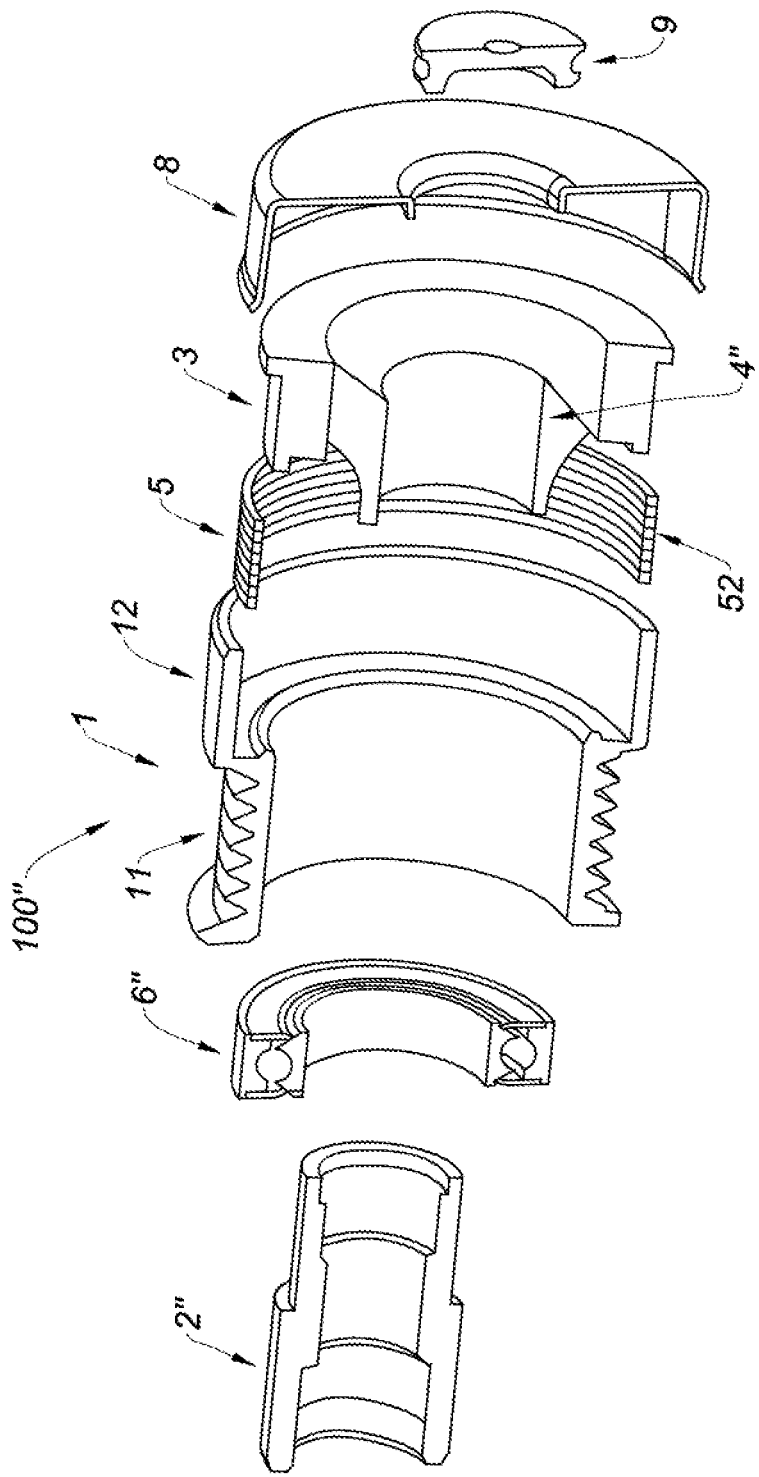
FIG. 12 is an exploded view of the pulley shown in FIG. 11.

We will now describe a third embodiment, supported by FIGS. 11 and 12, of a pulley 100" according to the invention (the sealing gasket 10 is not shown in these figures, but is present).

In this third embodiment, the elastically deformable element is no longer a torsion spring 4.

Indeed, the torsion spring is replaced by a body 4" made from an elastomer or a thermoplastic elastomer.

Due to this design, the hub 2" has an appropriate shape to receive this body 4" made from elastomer or a thermoplastic elastomer, by gluing or overmolding. Furthermore, this elastomer or thermoplastic elastomer body 4" can be fastened to the ring 3 by gluing or overmolding. The unidirectional clutch 5 can be the same as that of the first embodiment and the second embodiment, in particular through the existence of an end, for example in the form of an arm 51, fastened in the ring 3, and advantageously a wedge 60 as described in FIG. 16 (the arm 51 and the wedge 60 are not visible in FIGS. 11 and 12, due to the cutting plane chosen for these figures). In this case, however, the end of the arm does not need to be in contact with the elastomer or thermoplastic elastomer body 4", and it is therefore simply housed in the ring 3. A rolling bearing 6" is also provided mounted between the hub 2" and the wheel rim 1 to ensure the rotational driving of the hub 2". The rolling bearing 6" is then advantageously positioned below the first zone 11 of the wheel rim 1, due to the space left free by the absence of torsion spring 4. The presence of a bearing 6 is no longer necessary due to the presence of the rolling bearing 6". It will also be noted that, similarly to the second embodiment, the hub 2" does not include lugs and the ring 3" consequently does not include apertures to receive such lugs.

Functionally speaking, the third embodiment does not involve a maximum travel angle α1 in "coupling" mode. The value of the torque $C_0$ is no longer related to the slight bearing/hub friction, but to the residual friction within the rolling bearing 6". Otherwise, the pulley 100" works identically to the pulley 100. In particular, the body 4" works, i.e., deforms elastically, in the negative angle zone of FIG. 8 and is not stressed in the positive angle zones. Furthermore, the torque $C_1$-$C_0$ corresponds to the contribution of the friction between the cover 8 and the ring 3, when the side face 37 of the latter is mounted in contact with the cover 8.

Figure 13:
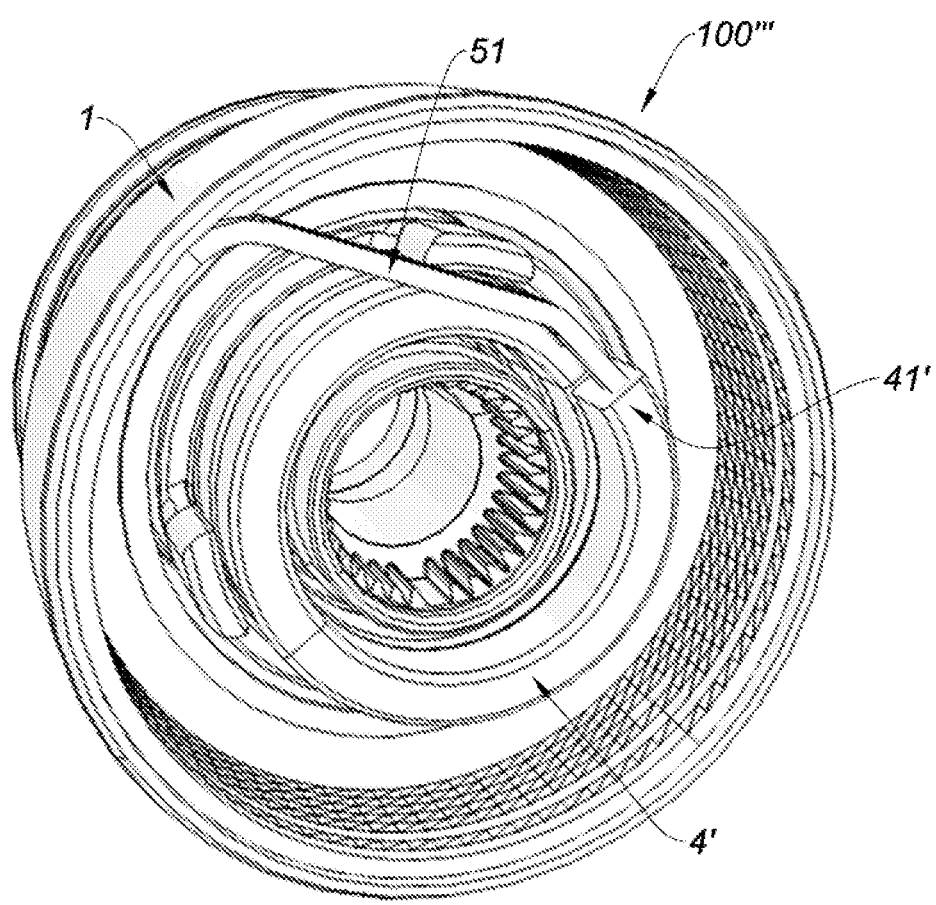
FIG. 13 shows a fourth embodiment of a pulley according to the invention, in a longitudinal perspective view, without a ring.
Figure 14:
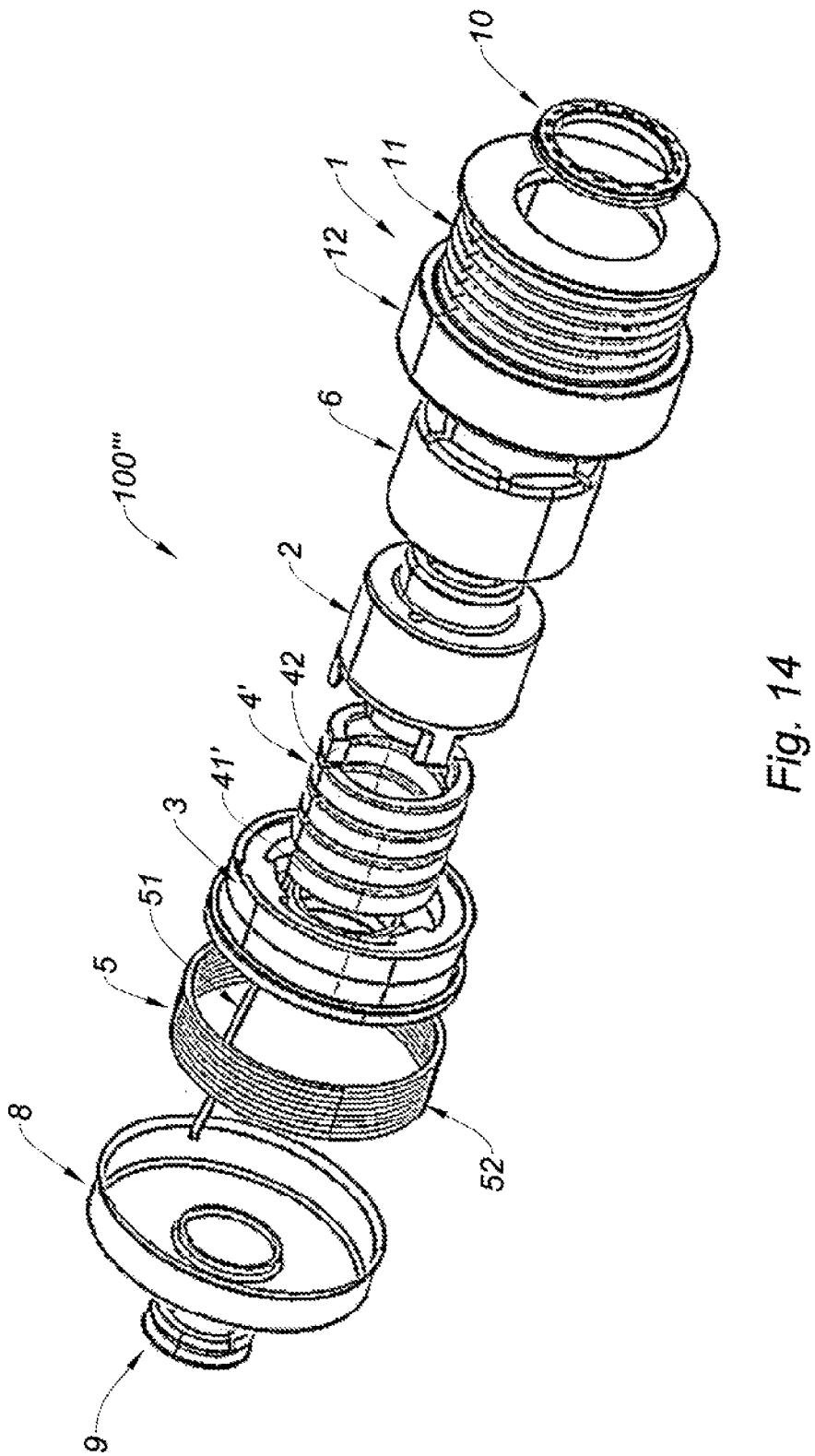
FIG. 14 is an exploded view of the pulley shown in FIG. 13.

We will now describe a fourth embodiment of a pulley according to the invention, supported by FIGS. 13 and 14.

In these figures, the fourth embodiment is shown as an alternative of the first embodiment.

In this fourth embodiment, the torsion spring no longer works by closure in the "coupling" mode, but by opening.

In this case, the hub 2 has a peripheral groove 25, such that when the torsion spring 4' works by opening, it can come into contact with the inner wall 26 of the peripheral groove 25 that is radially outermost within the peripheral groove 25 and belonging to the hub 2.

In this case, this also results in the absence of a curved end 41 relative to the rest of the torsion spring. The torsion spring 4' therefore here has a generally cylindrical shape. In other words, the end 41 of the torsion spring 4 that is in contact with the unidirectional clutch 5 is curved relative to the rest, defining a generally cylindrical shape, of said torsion spring 4'. The contact between the end of the arm 51 of the unidirectional clutch and the end 41' of the torsion spring 4' therefore no longer occurs by placing the end of the arm 51 against a side face 410 of the end 41 of the torsion spring 4, as is illustrated in FIG. 5 (first embodiment), but by placing the end 51 of the unidirectional clutch end to end with this non-curved end 41' of the torsion spring 4'. This design facilitates, in "coupling" mode, the opening of the torsion spring 4' against the wall 26 of the hub 2. Due to this design, the production of the torsion spring 4' is made easier. The unidirectional clutch 5 can therefore be the same as that of the first embodiment and a wedge 60 can be considered under the same installation conditions.

More generally, the rest is all identical.

It should be noted that this fourth embodiment is also applicable as an alternative of the second embodiment.

Figure 17:
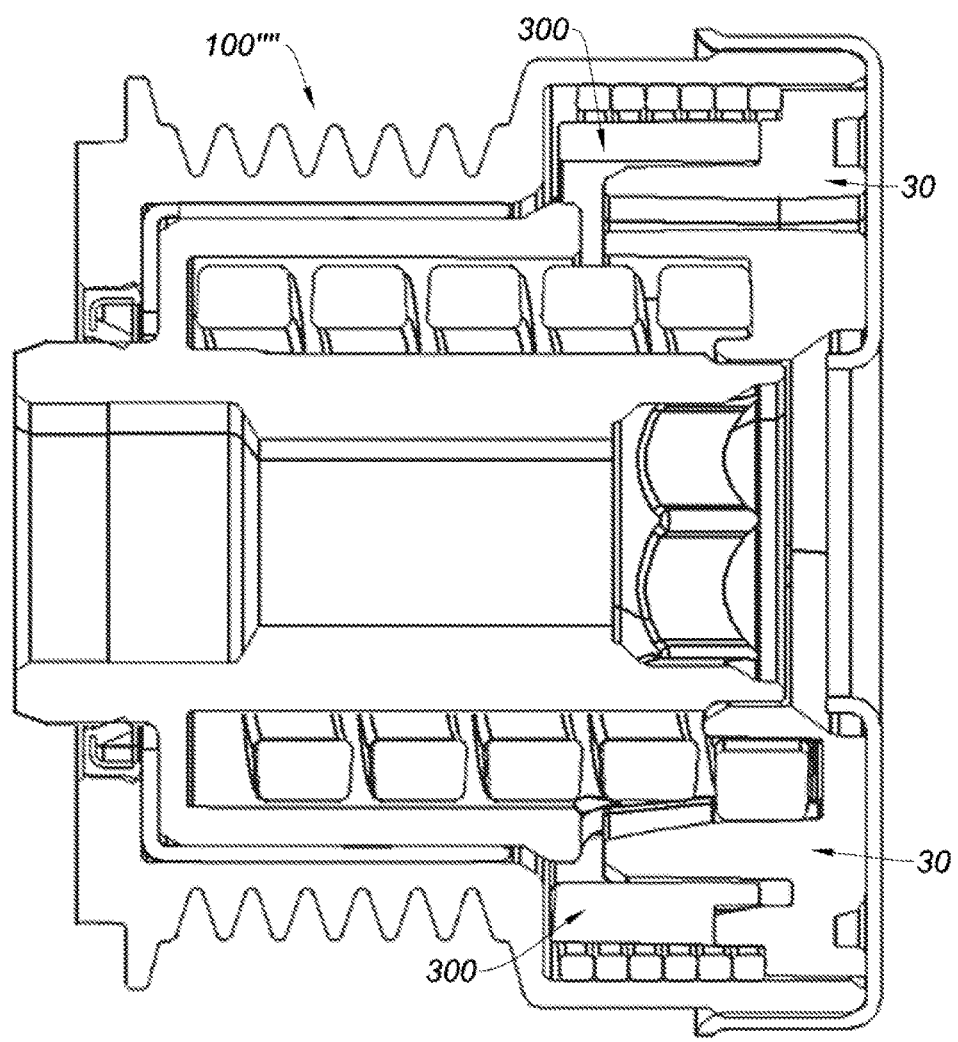
FIG. 17 shows a fifth embodiment of a pulley according to the invention, wherein the ring cooperates with a counter-ring, in a longitudinal sectional view.

FIG. 17 shows a longitudinal sectional view of a fifth embodiment of the invention. This FIG. 17 copies FIG. 4, for example with a counter-ring 300 cooperating with the ring 30.

The counter-ring 300 performs the same function as the wedge 60. The counter-ring 300 therefore replaces the wedge 60. The rest is all identical relative to the illustration of FIG. 4 and is therefore not referenced in FIG. 17.

For certain applications, however, this counter-ring 300 has advantages relative to the use of the wedge 60. Indeed, the assembly of the end 51 of the unidirectional clutch is easier with the use of a counter-ring 300. Furthermore, its use limits the deformation of the ring 30 during the mounting of the end 51 of the unidirectional clutch in the ring 30, since, unlike the wedge 60, there is no need to enter the ring by force.

Figure 18:
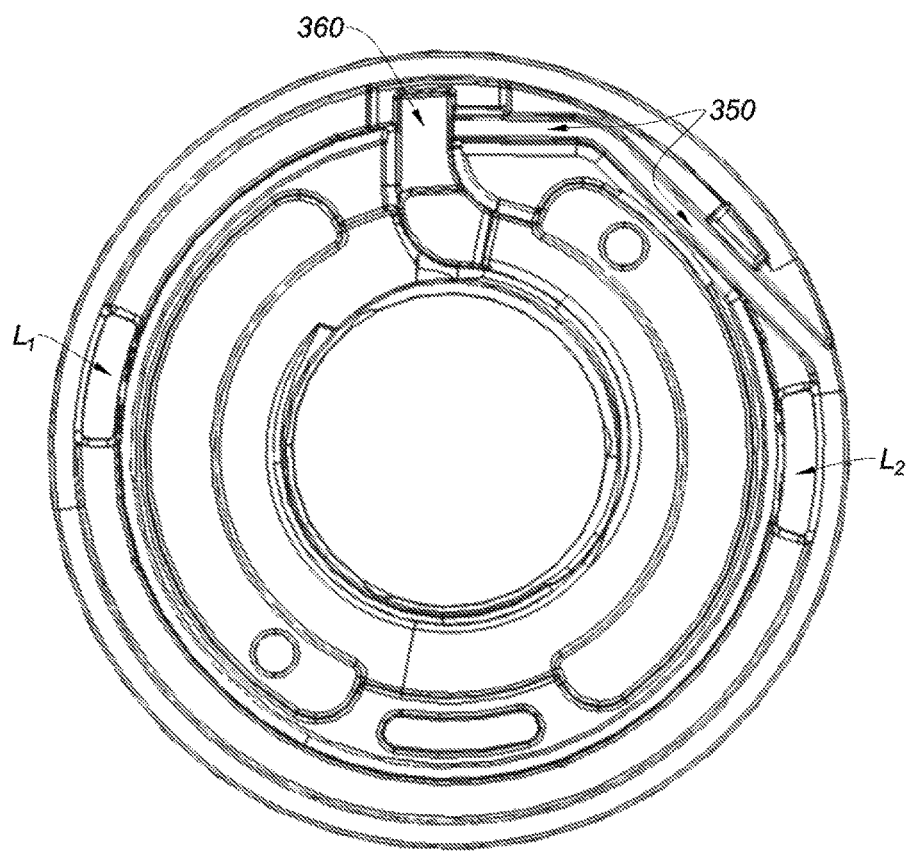
FIG. 18 is a front view of the ring of FIG. 17.
Figure 19:
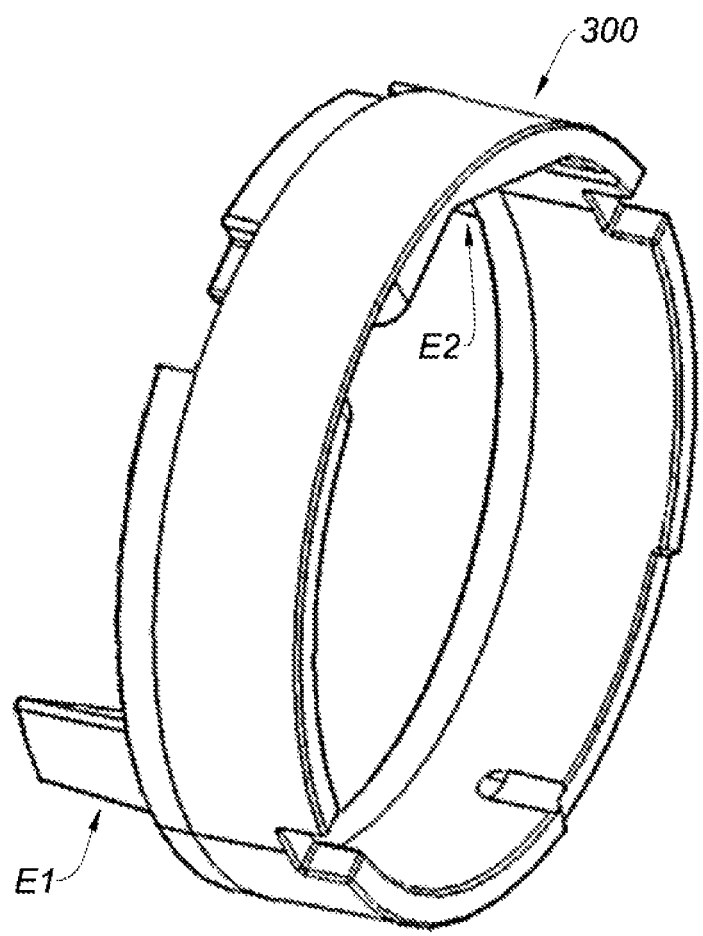
FIG. 19 is a rear perspective view of the counter-ring of FIG. 17, intended to cooperate with the ring of FIG. 18.

FIG. 18 shows a front view of the ring 30, and FIG. 19 shows the counter-ring 300 in rear perspective view. Here, the ring 30 comprises two apertures L1, L2 intended to receive a corresponding lug E1, E2 of the counter-ring 300. Once the counter-ring 300 is installed in the ring 30, no movement of the latter parts relative to one another is possible. The fastening can for example by done by ultrasound, in particular when the ring 30 and the counter-ring 300 are made from plastic. Of course, it is possible to provide other fastening modes (snapping, gluing, etc.). In FIG. 18, a housing 350 is present that is intended to receive the end 51 of the unidirectional clutch as well as another housing 360 that is in turn intended to receive the torsion spring 4. In general, the counter-ring 300 has a shape complementary to the ring 30.

It should be noted that the unidirectional clutch 5 can be designed in different ways.

Generally, the unidirectional clutch 5 assumes the form of a helical spring, preferably with adjacent turns.

This helical spring can also and traditionally assume the form of a cylinder. Indeed, traditionally, and aside from the end 51, all of the turns have a same diameter. This can for example be seen, after complete mounting of the pulley according to the invention (i.e., before the clutch spring is stressed by the other components of the pulley), in FIG. 3, 10, 12, 14 or 16.

However, other forms can be considered, such forms providing certain advantages relative to the cylindrical shape of this helical spring.

Indeed, the unidirectional clutch 5 works by friction. It is therefore necessary to avoid slipping when one wishes to allow torque to pass through the clutch.

The cylindrical shape is suitable for most cases.

However, for certain applications, the torque needing to be transmitted is higher and the cylindrical shape of the clutch spring may then reach its slipping limit, which does not allow torque to pass.

The applicant realized that shapes other than the cylindrical shape could make it possible to push back the slipping limit and thus to provide a pulley allowing a higher torque to pass, without increasing the number of turns, which is of interest to control the bulk.

Figure 20:
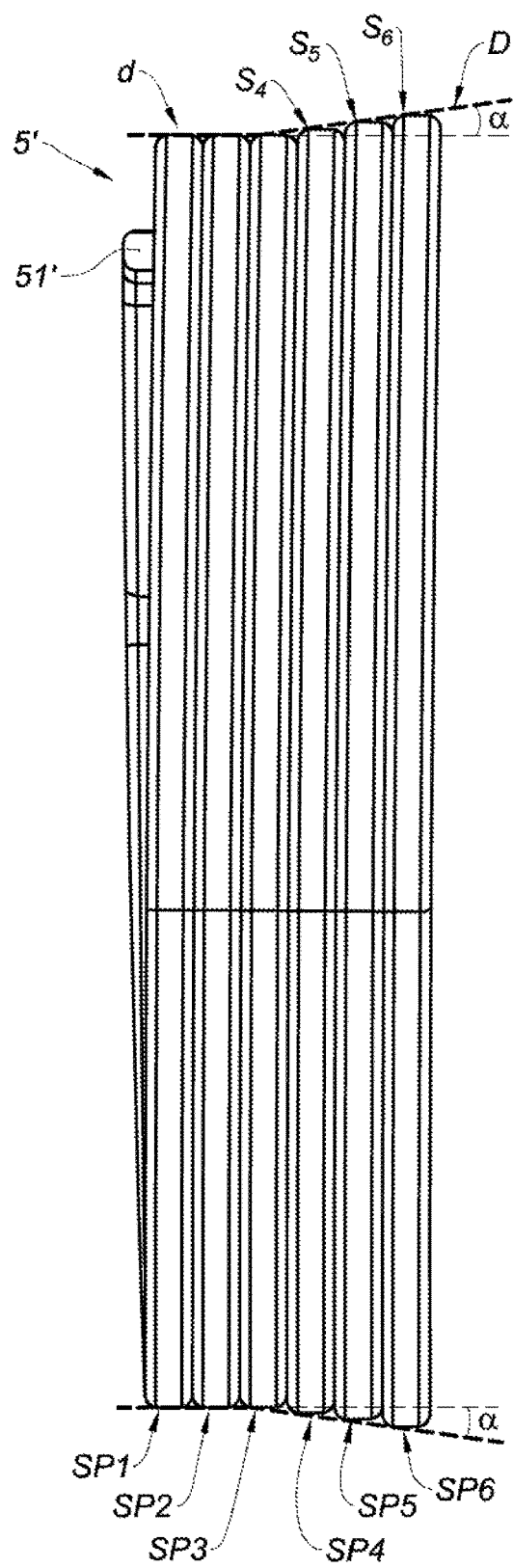
FIG. 20 is a side view of a unidirectional clutch that may be used in the context of the invention.

Thus, FIG. 20 shows a first example unidirectional clutch 5' assuming the form of a helical spring with adjacent turns that is not cylindrical (end 51' still set aside). Indeed, in this example, the turns SP1, SP2 and SP3 have a same diameter. However, the turn SP4 has a larger diameter than the turns SP1 to SP3, the turn SP5 has a larger diameter than the turn SP4, and the turn SP6 has a larger diameter than the turn SP5. Advantageously, and as shown in FIG. 20, the evolution of the diameters of the turns SP4, SP5 and SP6 is constant. In other words, it is possible to define a line passing through an apex S4, S5, S6 of each turn SP4, SP5, SP6. It is also possible to define this configuration by an angle α between the line D and the line d passing through the apices of the turns SP1, SP2 and SP3 (the line d is parallel to the longitudinal axis of the unidirectional clutch 5'). The angle α can in particular be comprised between 5° and 10°, and for example 7.5°.

In general, the shape of this clutch spring (see the dotted lines) is defined by a first cylindrical part (in the case at hand formed by the turns SP1 to SP3), in the extension of the end 51' intended to be fastened to the ring, and a second frustoconical part (in the case at hand formed by the turns SP4 to SP6), in the extension of the first part.

With this design, it is then possible to mount the clutch spring 5' with a traditional tightening for the turns SP1 to SP3 and to provide greater tightening for the turns SP4 to SP6 and even, if applicable, still greater tightening when the diameter of the turn in question is large. By thus increasing the tightening on the turns SP4 to SP6, the slipping limit is pushed back and it is therefore possible to allow a greater torque to pass. Furthermore, the design does not pose any particular difficulties, relative to a cylindrical spring, when the pulley works in the overrun clutch mode. However, this design nevertheless makes the mounting of the free end (that which is opposite the end 51', not visible in FIG. 20) of the clutch spring slightly more difficult.

Figure 21:
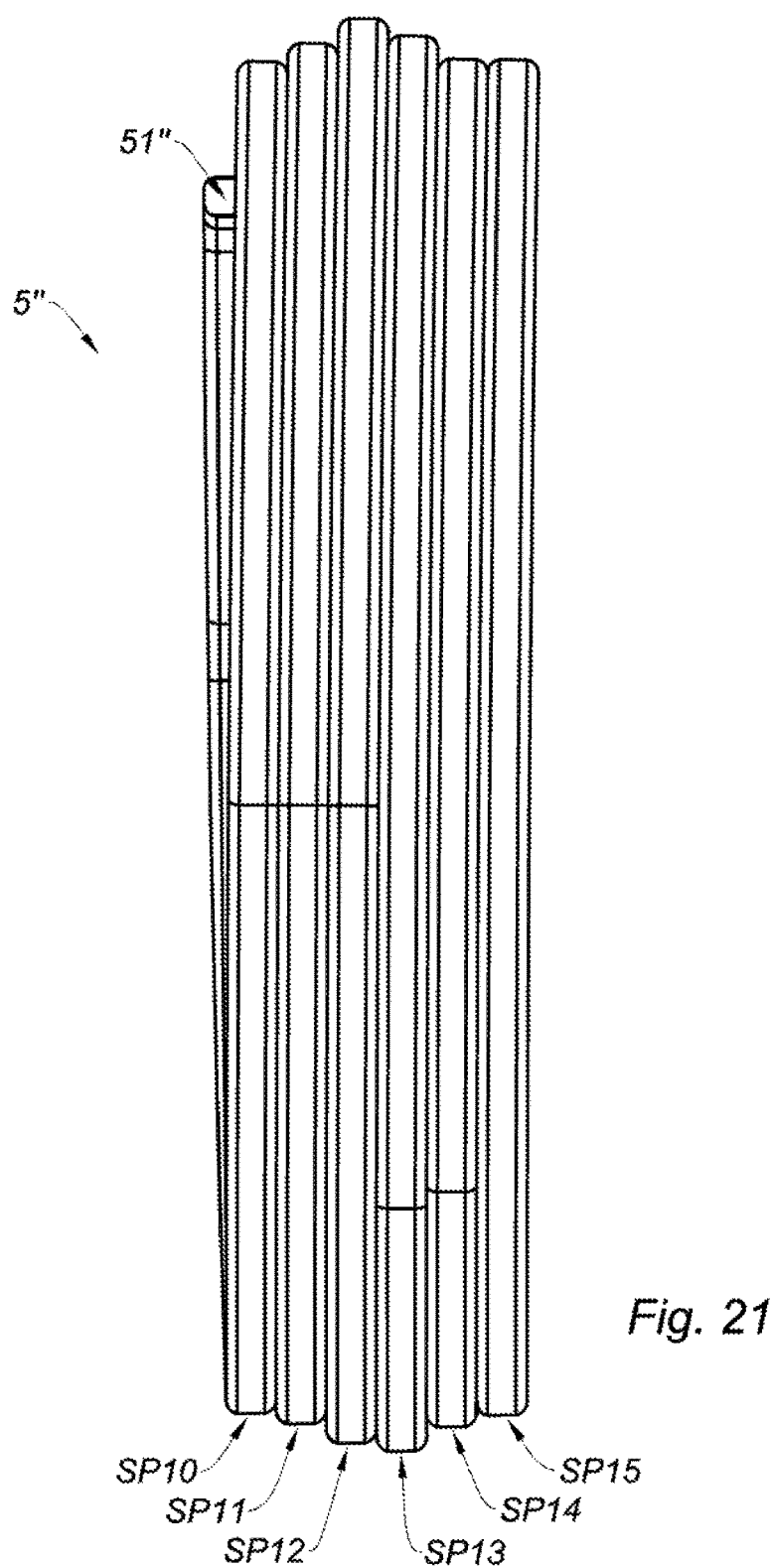
FIG. 21 is a side view of another unidirectional clutch that may be used in the context of the invention.

Thus additionally, FIG. 21 shows a second example unidirectional clutch 5" assuming the form of a helical spring, in the case at hand with adjacent turns, that is not cylindrical (end 51" still set aside). Indeed, in this example, the general shape is that of a barrel. The end turns SP10, SP15 therefore have the smallest diameters, and the central turns SP12, SP13 have the largest diameters. The intermediate turns SP11, SP14 have diameters larger than those of the end turns SP10, SP15 but smaller than those of the central turns SP12, SP13.

Similarly to the design of FIG. 20, the turns with a larger diameter SP12, SP13 can be tightened more relative to a case where the clutch spring is cylindrical. Here again, the slipping limit is therefore slightly pushed back, which allows a greater torque to pass. Furthermore, the free end of the clutch spring is then stressed less than in the design of FIG. 20, which does not have any harmful consequences for the ease of assembly. However, the design of FIG. 21 gives the pulley a residual torque, during operation in the overrun clutch mode.

Figure 22:
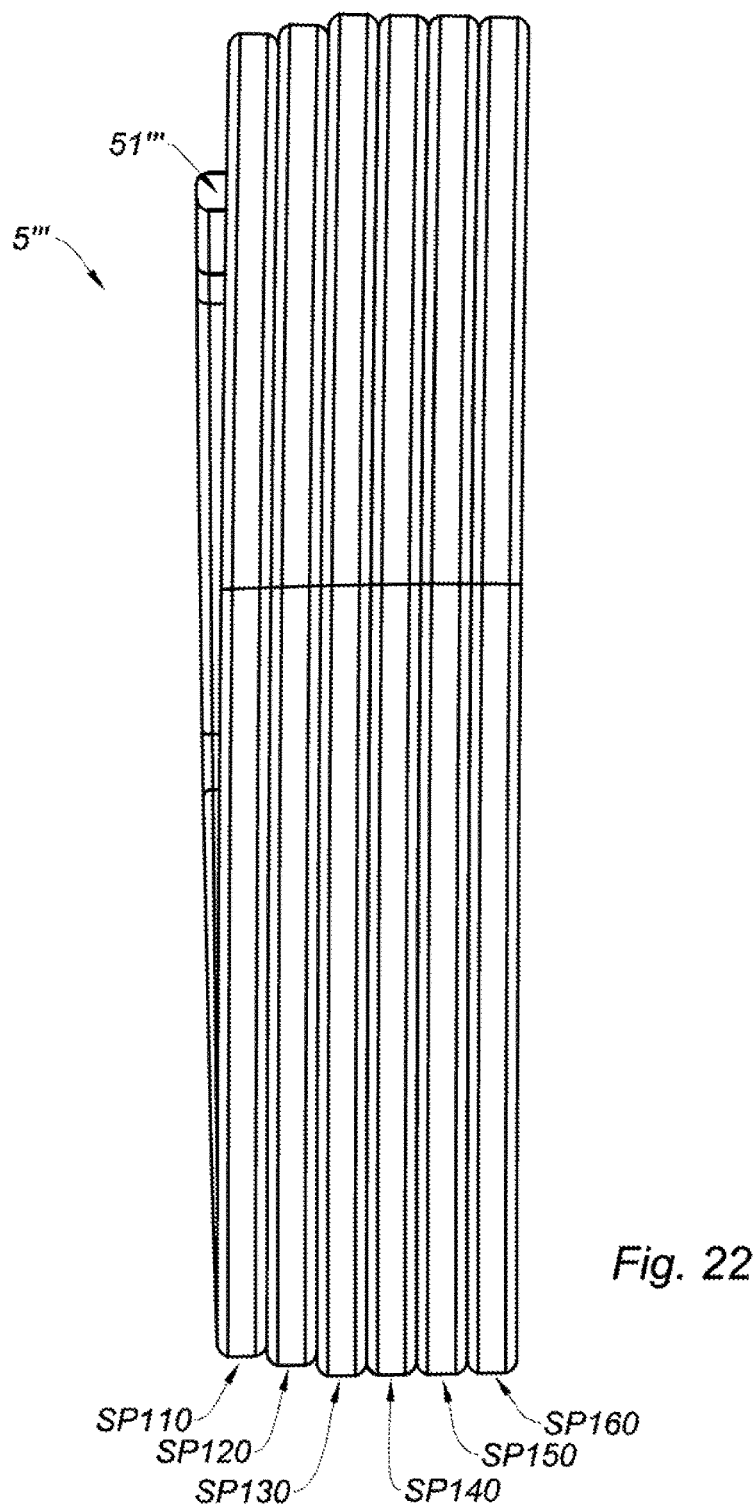
FIG. 22 is a side view of still another unidirectional clutch that may be used in the context of the invention.

FIG. 22 shows a third example unidirectional clutch 5''' assuming the form of a helical spring, in the case at hand with adjacent turns, that is not cylindrical (end 51''' still set aside). In this example, the turn SP110 has a first diameter, the turns SP130, SP140, SP150 and SP160 having a second and same diameter and the turn SP120 is an intermediate turn whose diameter changes to go from the turn SP110 to the turn SP130. The second diameter is larger than the first diameter.

In general, the shape of this clutch spring is defined by a first frustoconical part (in the case at hand formed by the turns SP110 to SP120), in the extension of the end 51' intended to be fastened to the ring, and a second cylindrical part (in the case at hand formed by the turns SP130 to SP160), in the extension of the first part.

With respect to a cylindrical spring, the design of FIG. 22 makes it possible to push back the slipping limit. Furthermore, like for a cylindrical design, it does not pose mounting difficulties and has no particular drawbacks when the pulley operates in the overrun clutch mode.

This last design is therefore particularly advantageous.

To provide an example, one may consider a unidirectional clutch 5, assuming the form of a helical spring with adjacent turns, having a cylindrical shape, intended to be placed in a pulley according to the invention whose diameter D12=58 mm. Uniform tightening of 1.6 mm is then provided. This incidentally means that the diameter of the clutch spring is, before mounting, 59.6 mm. Furthermore, the unidirectional clutch 5 here is made from a steel according to standard EN10270-1 SH. The wheel rim 1 is made from a steel of type AISI 1018 with, as the contact surface with the unidirectional clutch, nitriding to obtain a hardness greater than 300HV0.1.

Similarly, for a unidirectional clutch 5''' according to FIG. 22, and for the same pulley with diameter D12=58 mm, one then provides, for the turn SP110, a tightening of 1 mm and for the turns SP130 to SP160, a tightening of 2 mm. These tightenings then incidentally define the tightening of the transitional turn SP120. Furthermore, the unidirectional clutch here is made from a steel according to standard EN10270-1 SH. The wheel rim 1 is made from a steel of type AISI 1018 with, as the contact surface with the unidirectional clutch, nitriding to obtain a hardness greater than 300HV0.1.

Figure 23:
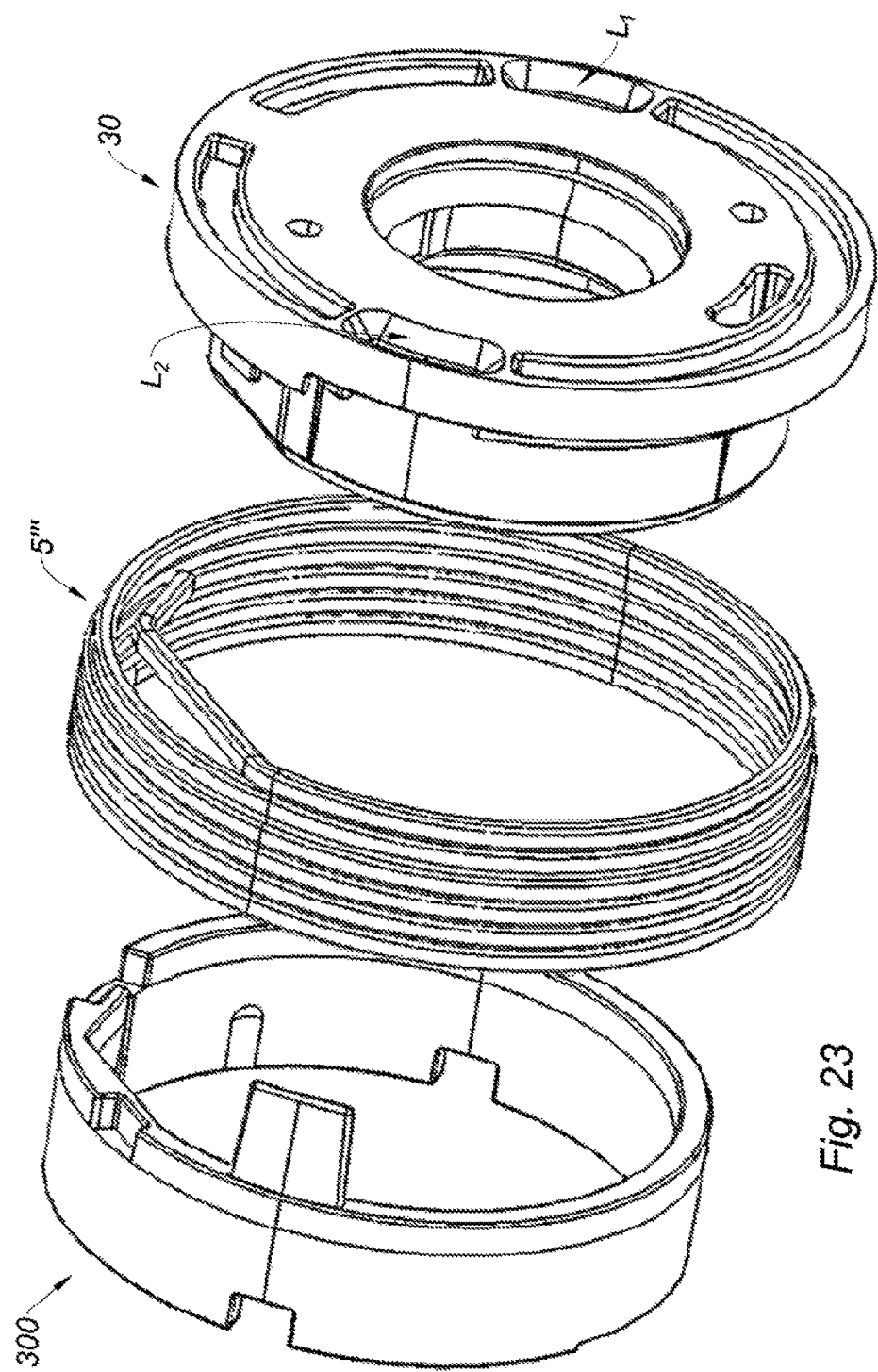
FIG. 23 is an exploded view of a ring and a counter-ring according to the fifth embodiment of a pulley according to the invention shown in FIG. 17, with a unidirectional clutch according to FIG. 22.
Figure 24:
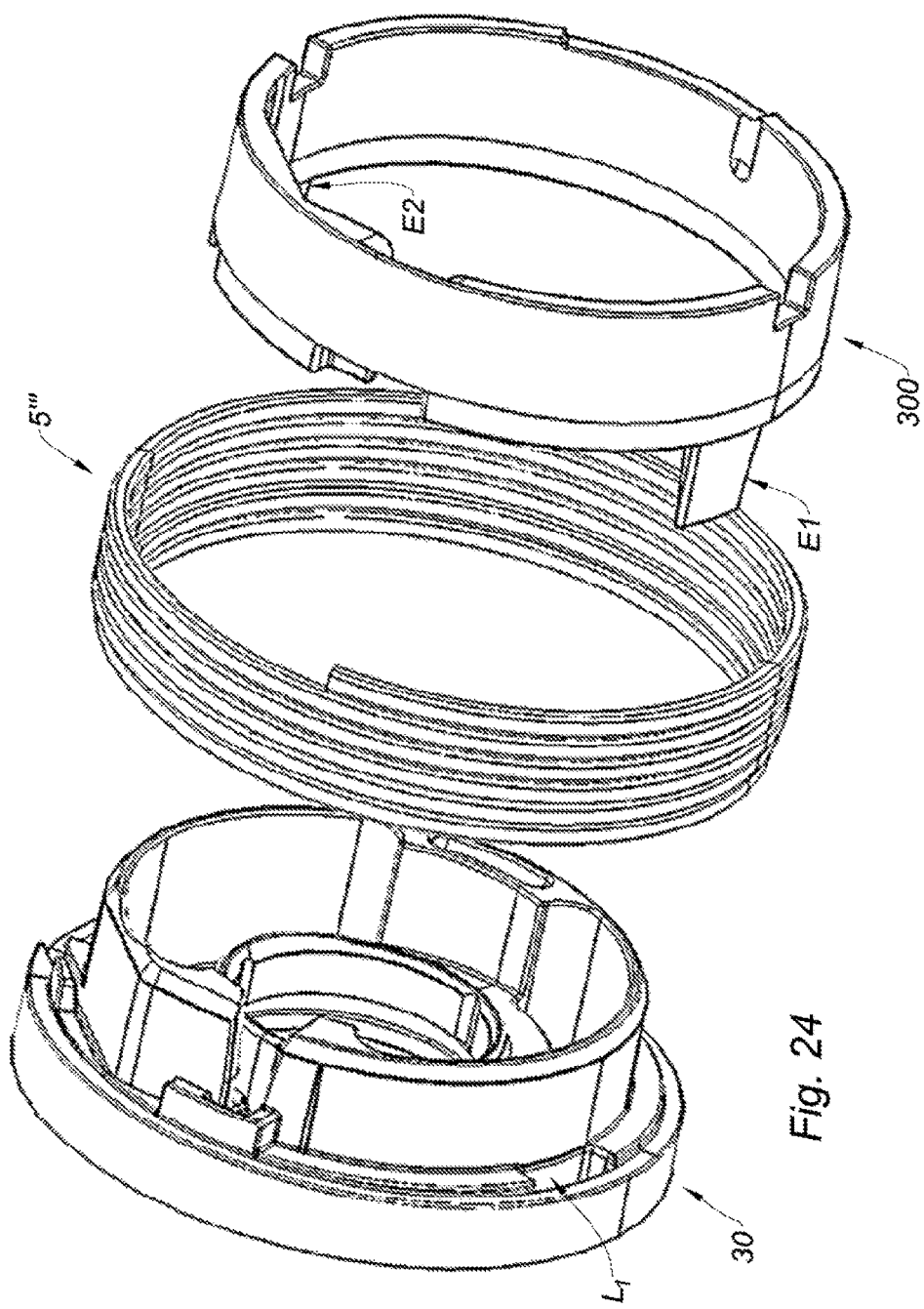
FIG. 24 is a reversed perspective view relative to that of FIG. 23.

In FIGS. 23 and 24, the ring 30, the counter-ring 300 and a unidirectional clutch 5''' are shown according to the design of FIG. 22, before mounting.

Irrespective of the considered embodiment, a pulley according to the invention provides several advantages relative to the prior art.

Indeed, axially offsetting the unidirectional clutch 5, 5', 5", 5''' relative to the first zone 11 of the wheel rim 1, owing to a ring 3, 30 also axially offset and serving as mechanical support for the unidirectional clutch, provides several forms of freedom in the design.

This is even more true when the unidirectional clutch is completely situated below the second zone 12 of the wheel rim 1 (therefore absolutely not, even partially, below the first zone 11 of the wheel rim 1) and/or when the ring 3, 30, 30' is completely situated below the second zone 12 of the wheel rim as well (therefore absolutely not, even partially, below the first zone 11 of the wheel rim 1) and in that the diameters D11 and D12 are equal or the diameter D12 is (strictly) larger than the diameter D11.

Thus, when a torsion spring 4 is used in the context of the invention, this frees a space between the hub 2 and the wheel rim 1 that allows the insertion of a bearing 6. One thus avoid using one or several rolling bearings (document D1) in which, for lack of space in the radial area between the torsion spring and the clutch are installed on the sides [sic]. This makes the pulley lighter and generally reduces its axial bulk.

Thus additionally, when an elastically deformable body 4" is used in the context of the invention, it is possible to implement a rolling bearing centered below the first zone 11 of the wheel rim 1 (reception zone of the belt), since the entire space is freed without increasing the radius of the pulley at this zone 11 of the wheel rim and without generating a greater axial bulk.

In general, the ring 3, 30 provides mechanical support to the unidirectional clutch 5, 5', 5", 5''', which can only be beneficial.

The ring 3, 30 also makes it possible, through the presence of apertures therein, to allow a direct interaction with hub lugs to limit the deformation of the torsion spring 4.

Furthermore, the implementation of a ring able to rotate relative to the wheel rim 1 and/or, depending on the operating mode, relative to the hub 2 is particularly interesting. Indeed, when this ring 3, 30 is in contact with the cover 8, braking is provided in the "overrun clutch" mode only, such that this braking is done only when it is necessary (limiting noise, for example rotation of the ring 3 with the hub 2 when the latter is experiencing an overspeed relative to the wheel rim 1). In the "coupling" mode, this friction does not exist, which improves the passage of torque without using the ring 3, 30 or the cover 8 needlessly.

Additionally, when the second zone 12 of the wheel rim 1 has an inner diameter $D_{12}$ larger than the inner diameter $D_{11}$ of the first zone 11 of the wheel rim, it is possible to use a unidirectional clutch 5 whereof the diameter is larger than that which is proposed in document D1. This is particularly interesting, since the torque that may be transmitted by the unidirectional clutch 5, 5', 5", 5'" is limited by its diameter. In the context of the invention, it is therefore possible to implement a unidirectional clutch able to allow higher torques to pass. Incidentally, for a given torque on the unidirectional clutch, the tangential force applied to it (friction with the wheel rim 1) is then lower than in document D1.

The lifetime of the unidirectional clutch 5, 5', 5", 5'" then can only be improved.

The invention claimed is:

1. An uncoupling pulley provided with a longitudinal axis, said pulley including:
   a wheel rim, comprising a first zone, intended to receive a belt connecting the wheel rim to a first power transmission element, and a second zone situated in the axial extension, namely, along the direction defined by the longitudinal axis (AX) of the pulley, of the first zone;
   a hub intended to be secured to a second power transmission element;
   one of the power transmission elements being driving, and the other being driven;
   a ring mounted below the second zone of the wheel rim and around the hub, such that said ring can rotate, around said longitudinal axis, relative to the wheel rim and/or the hub;
   an elastically deformable element mounted between the hub and the ring, and fastened both to the hub and to the ring;
   a unidirectional clutch, one end of which is fastened to the ring and the remaining part of which is mounted both above the ring below the second zone of the wheel rim so that, in a coupling mode, said unidirectional clutch exerts a radial force against an inner bore of said wheel rim;
   the pulley also being such that:
   the first zone of the wheel rim has an inner diameter ($D_{11}$);
   the second zone (12) of the wheel rim has an inner diameter ($D_{12}$);
   the inner diameter ($D_{12}$) of the second zone being larger than the inner diameter ($D_{11}$) of the first zone.

2. The pulley according to claim 1, wherein a cover is provided mounted securely on the wheel rim, and in contact with the ring.

3. The pulley according to claim 1, wherein the elastically deformable element is a torsion spring centered on the hub.

4. The pulley according to claim 3, wherein the end of the unidirectional clutch is arranged to contact with one end of the torsion spring.

5. The pulley according to claim 4, wherein:
   the end of the torsion spring that is in contact with the unidirectional clutch is curved, relative to the rest, defining a cylindrical general shape of said torsion spring; and
   the end of the unidirectional clutch is in contact with a side face of this curved end of the torsion spring.

6. The pulley according to claim 4, wherein:
   the end of the torsion spring that is in contact with the unidirectional clutch is not curved, relative to the rest, defining a cylindrical general shape of said torsion spring; and
   the end of the unidirectional clutch is placed end to end with this non-curved end of the torsion spring.

7. The pulley according to claim 4, wherein:
   the hub comprises at least one lug; and
   the ring comprises at least one aperture receiving said at least one hub lug;
   such that in a relative rotation direction between the wheel rim and the hub, the torsion spring engages on the hub until said at least one hub lug abuts against one end of said at least one ring aperture.

8. The pulley according to claim 4, including at least one bearing situated between the wheel rim and the hub.

9. The pulley according to claim 8, wherein said at least one bearing includes at least one face extending radially and in contact with the hub.

10. The pulley according to claim 8, wherein said at least one bearing is either made from a plastic material chosen from among polyether ether ketone (PEEK), polyethylene terephthalate (PET), polyamide (PA) filled with molybdenum disulfide ($MoS_2$) or polyamide filled with polytetrafluoroethylene (PTFE) or with a metal or metal alloy inner layer, covered by an outer layer filled with polytetrafluoroethylene (PTFE).

11. The pulley according to claim 1, wherein the elastically deformable element is a body made from elastomer or elastomer thermoplastic.

12. The pulley according to claim 11, wherein at least one rolling bearing is arranged between the hub and the wheel rim, advantageously below the first zone of the wheel rim.

13. The pulley according to claim 1, wherein the end of the unidirectional clutch is housed in a slit of the ring, said pulley further including a wedge situated in the slit, and next to said second end of the unidirectional clutch.

14. The pulley according to claim 1, comprising a counter-ring cooperating with the ring via apertures provided in the ring and lugs provided in the counter-ring.

15. The pulley according to claim 1, wherein the unidirectional clutch is a helical spring.

16. The pulley according to claim 1, wherein the unidirectional clutch is a helical spring with adjacent turns.

17. The pulley according to claim 15, wherein the helical spring has a shape chosen from among:
   a cylindrical shape;
   a shape comprising a first cylindrical part, in the extension of its end intended to be fastened to the ring, and a second frustoconical part, in the extension of the first part;
   a barrel shape; or
   a shape comprising a first frustoconical part, in the extension of its end intended to be fastened to the ring, and a second cylindrical part, in the extension of the first part.

* * * * *